(12) United States Patent
Tanaka et al.

(10) Patent No.: US 8,382,159 B2
(45) Date of Patent: Feb. 26, 2013

(54) STEERING-FORCE TRANSMITTING APPARATUS FOR VEHICLE

(75) Inventors: Hajime Tanaka, Toyota (JP); Tomonari Yamakawa, Hoi-gun (JP)

(73) Assignees: Toyota Jidosha Kabushiki Kaisha, Toyota-shi (JP); JTEKT Corporation, Osaka-shi (JP)

( * ) Notice: Subject to any disclaimer, the term of this patent is extended or adjusted under 35 U.S.C. 154(b) by 66 days.

(21) Appl. No.: 13/062,572

(22) PCT Filed: Sep. 14, 2009

(86) PCT No.: PCT/JP2009/066470
§ 371 (c)(1),
(2), (4) Date: Mar. 7, 2011

(87) PCT Pub. No.: WO2010/038638
PCT Pub. Date: Apr. 8, 2010

(65) Prior Publication Data
US 2011/0163526 A1    Jul. 7, 2011

(30) Foreign Application Priority Data

Sep. 30, 2008   (JP) ................................ 2008-254781
Sep. 30, 2008   (JP) ................................ 2008-254782

(51) Int. Cl.
*B62D 1/16*           (2006.01)
(52) U.S. Cl. ....................................................... 280/779
(58) Field of Classification Search .................. 280/777, 280/779; 180/444; 74/496
See application file for complete search history.

(56) References Cited

U.S. PATENT DOCUMENTS

| 5,156,228 A | | 10/1992 | Kato et al. | |
| 5,303,793 A | * | 4/1994 | Kato et al. | ..................... 180/417 |
| 5,899,293 A | * | 5/1999 | Ono | ............................. 180/441 |
| 2006/0151235 A1 | * | 7/2006 | Chikaraishi | ................... 180/444 |

FOREIGN PATENT DOCUMENTS

| DE | 41 02 913 | 8/1991 |
| JP | 3 227772 | 10/1991 |
| JP | 5 178222 | 7/1993 |
| JP | 6 92245 | 4/1994 |
| WO | 2009 077832 | 6/2009 |
| WO | 2009 077838 | 6/2009 |

OTHER PUBLICATIONS

International Search Report Issued Jan. 29, 2010 in PCT/JP09/066470 filed Sep. 14, 2009.

\* cited by examiner

*Primary Examiner* — Paul N Dickson
*Assistant Examiner* — Robert A Coker
(74) *Attorney, Agent, or Firm* — Oblon, Spivak, McClelland, Maier & Neustadt, L.L.P.

(57) ABSTRACT

A steering-force transmitting apparatus including (a) an operating-member-side shaft; (b) a turning-device-side shaft offset from the operating-member-side shaft; and (c) a rotation transmitting mechanism having (c-1) an axially protruding portion provided in one of the two shafts and (c-2) a radially extending groove provided in the other of the two shafts such that the axially protruding portion is engaged in the radially extending groove. The rotation transmitting mechanism is configured to change a rotational phase difference between the two shafts while causing one of the two shafts to be rotated by rotation of the other of the two shafts. An axially end portion of a main body portion of one of the two shafts and an axially end portion of the other of the two shafts overlap with each other in the axial direction.

16 Claims, 13 Drawing Sheets

US 8,382,159 B2

STEERING-FORCE TRANSMITTING APPARATUS FOR VEHICLE

This application is based on Japanese Patent Applications No. 2008-254781 and No. 2008-254782 filed on Sep. 30, 2008, the content of which is incorporated hereinto by reference.

TECHNICAL FIELD

The present invention relates to a steering-force transmitting apparatus for a vehicle, which is configured to transmit a steering force that is applied to a steering operation member of a vehicle, to a wheel turning device of the vehicle.

BACKGROUND ART

In recent years, there is a development of a steering-force transmitting apparatus for a vehicle having (i) a steering operation member operable by an operator of the vehicle and (ii) a wheel turning device configured to turn a wheel of the vehicle. The steering-force transmitting apparatus includes an operating-member-side shaft that is connected at its axial end portion to the steering operation member, a turning-device-side shaft that is connected at its axial end portion to the wheel turning device, and a rotation transmitting mechanism that is configured to change a rotational phase difference between a rotational phase of the operating-member-side shaft and a rotational phase of the turning-device-side shaft while causing one of the operating-member-side shaft and turning-device-side shaft to be rotated by rotation of the other of the operating-member-side shaft and turning-device-side shaft. JP-H03-227772A, JP-H05-178222A and JP-H06-92245A disclose examples of a steering-force transmitting apparatus equipped with the above-described rotation transmitting mechanism.

DISCLOSURE OF THE INVENTION

(A) Outline of the Invention

The steering-force transmitting apparatus equipped with the above-described rotation transmitting mechanism, as compared with a steering-force transmitting apparatus not equipped with the rotation transmitting mechanism, is more likely to have a large length as measured in its axial direction. Therefore, the steering-force transmitting apparatus equipped with the rotation transmitting mechanism has difficulty in being installed onto a vehicle, since it requires an installation space having a larger length as measured in a longitudinal direction of the vehicle, as compared with the steering-force transmitting apparatus not equipped with the rotation transmitting mechanism. Thus, the steering-force transmitting apparatus provided with the rotation transmitting mechanism is still in a developing stage with various problems such as the above-described installation difficulty, and there is still room for improvements. That is, it is considered that practicability of the steering-force transmitting apparatus can be increased by various improvements applied to the apparatus. The present invention was made in the light of the background art discussed above, and has an object of the invention to provide a steering-force transmitting apparatus having a high practicability.

This object may be achieved according to the principle of this invention, which provides a steering-force transmitting apparatus including: (a) an operating-member-side shaft rotatable about an axis thereof; (b) a turning-device-side shaft rotatable about an axis thereof which is parallel to the axis of the operating-member-side shaft and which is offset from the axis of the operating-member-side shaft by a predetermined offset distance; and (c) a rotation transmitting mechanism. The rotation transmitting mechanism includes (c-1) an engaging portion which is provided in a first shaft as one of the operating-member-side shaft and the turning-device-side shaft, and which is held in engagement with an axial end portion of a second shaft as the other of the operating-member-side shaft and the turning-device-side shaft. The engaging portion is located in a non-central position that is distant from the axis of the first shaft in a radial direction of the first shaft by a distance larger than the predetermined offset distance. The rotation transmitting mechanism further includes (c-2) a guide passage which is provided in the above-described axial end portion of the second shaft and which is held in engagement with the engaging portion. The guide passage extends in a radial direction of the second shaft so as to allow displacement of the engaging portion in the radial direction. The rotation transmitting mechanism is configured to change a rotational phase difference between a rotational phase of the first shaft and a rotational phase of the second shaft, while causing one of the first and second shafts to be rotated by rotation of the other of the first and second shafts. The first shaft includes: a first main body portion as a main body portion of the first shaft; a radially extending portion provided in a second-shaft side end portion of the first main body portion and located in an axially shifted position that is shifted from a second-shaft side end of the first main body portion, in a direction which is away from the second shaft and which is parallel to an axial direction; and an axially protruding portion located in the non-central position and protruding from the radially extending portion in a direction which is toward the second shaft and which is parallel to the axial direction. The second-shaft side end of the first main body portion is located between a first-shaft side end of the second shaft and another axial end portion of the second shaft in the axial direction.

In the steering-force transmitting apparatus according to the invention, an axially end portion of the main body portion of one of the operating-member-side shaft and turning-device-side shaft and an axially end portion of the other of the operating-member-side shaft and turning-device-side shaft overlap with each other in the above-described axial direction. This arrangement enables the apparatus to have a small length as measured in the axial direction, thereby making it possible to facilitate installation of the apparatus onto the vehicle, namely, to improve installability of the apparatus onto the vehicle. Owing to such a technical advantage, the present invention is effective to improve practicability of the steering-force transmitting apparatus provided with the rotation transmitting mechanism.

(B) Modes of the Invention

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiment of the invention. In a limit in accordance with such an interpretation, a mode of the claimable invention can be constituted by not only any one of these modes but also either a mode provided by any one of these modes and additional component or components incorporated therein and a mode provided by any one of these modes without some of components recited therein. It is noted that mode (0) described below is a mode serving as a base of a steering-force transmitting apparatus as the claimable invention, and the claimable invention can be constituted by combination of features recited in mode (0) with features recited in suitably selected one or ones of the other modes.

(0) A steering-force transmitting apparatus for a vehicle having (i) a steering operation member operable by an operator of the vehicle and (ii) a wheel turning device configured to turn a wheel of the vehicle, the steering-force transmitting apparatus including:

(a) an operating-member-side shaft connected at one of axially opposite end portions thereof to the steering operation member, and rotatable about an axis thereof;

(b) a turning-device-side shaft connected at one of axially opposite end portions thereof to the wheel tuning device, and rotatable about an axis thereof which is parallel to the axis of the operating-member-side shaft and which is offset from the axis of the operating-member-side shaft by a predetermined offset distance; and (c) a rotation transmitting mechanism including:

(c-1) an engaging portion which is provided in a first shaft as one of the operating-member-side shaft and the turning-device-side shaft, and which is held in engagement with the other of the axially opposite end portions of a second shaft as the other of the operating-member-side shaft and the turning-device-side shaft, the engaging portion being located in a non-central position that is distant from the axis of the first shaft in a radial direction of the first shaft by a distance larger than the predetermined offset distance; and (c-2) a guide passage which is provided in the other of the axially opposite end portions of the second shaft and which is held in engagement with the engaging portion, the guide passage extending in a radial direction of the second shaft so as to allow displacement of the engaging portion in the radial direction of the second shaft, wherein the rotation transmitting mechanism is configured to change a rotational phase difference between a rotational phase of the first shaft and a rotational phase of the second shaft, while causing one of the first and second shafts to be rotated by rotation of the other of the first and second shafts, wherein the first shaft includes:

a first main body portion which is a main body portion of the first shaft, and which has axially opposite end portions such that one of the axially opposite end portions of the first main body portion is a second-shaft side end portion of the first main body portion that is closer to the second shaft than the other of the axially opposite end portions of the first main body portion;

a radially extending portion provided in the second-shaft side end portion of the first main body portion, and extending outwardly from the first main body portion in the radial direction of the first shaft; and an axially protruding portion provided in the first shaft and located in the non-central position, the axially protruding portion protruding from the radially extending portion in a direction which is toward the second shaft and which is parallel to an axial direction parallel to the axis of the first shaft and the axis of the second shaft, wherein the second shaft includes:

a second main body portion which is a main body portion of the second shaft, and which has axially opposite end portions such that one of the axially opposite end portions of the second main body portion is a first-shaft side end portion of the second main body portion that is closer to the first shaft than the other of the axially opposite end portions of the second main body portion; and a radially projecting portion provided in the first-shaft side end portion of the second main body portion, and projecting outwardly from the second main body portion in the radial direction of the second shaft, the radially projecting portion having a radially extending groove which has an opening that opens in an axial end surface of the radially projecting portion and which extends in the radial direction of the second shaft, and wherein the axially protruding portion of the first shaft is introduced into the radially extending groove of the second shaft via the opening, so as to be engaged in the radially extending groove, whereby the axially protruding portion serves as the engaging portion while the radially extending groove serves as the guide passage.

The present mode (0) is a mode serving as a base of a steering-force transmitting apparatus as the claimable invention, and reciting basic components that are to be included in the steering-force transmitting apparatus. The "rotation transmitting mechanism" recited in this mode (0) is configured to change the rotational phase difference as a difference between the rotational phases of the respective two shafts, namely, to change a difference between an angle of rotation of the operating-member-side shaft and an angle of rotation of the turning-device-side shaft. For example, when the operating-member-side shaft is rotated from a predetermined rotational angle (that establishes a no-difference state in which there is no difference between the rotational phases of the respective two shafts, i.e., the rotational phase difference is zero), the turning-device-side shaft is rotated only by an angle that is smaller than the angle of rotation of the operating-member-side shaft, until the operating-member-side shaft is rotated by 180°. When the operating-member-side shaft has been rotated by 180°, the turning-device-side shaft is rotated also by 180°, so that the difference between the angles of rotations of the two shafts becomes zero. That is, while the operating-member-side shaft is rotated from the predetermined rotational angle to 180° as another predetermined rotational angle, the difference between the angles of rotations of the two shafts is gradually increased from zero in a first-half stage and then gradually reduced to zero in a second-half stage. Thus, a gear ratio between angular speeds of the respective rotated two shafts, i.e., a ratio of a rotational speed of the turning-device-side shaft to a rotational speed of the operating-member-side shaft is increased as the operating-member-side shaft is rotated from the predetermined rotational angle to 180°. Where the predetermined rotational angle corresponds to a rotational angle of the operating-member-side shaft that is established by positioning the steering operation member in its neutral operating position that causes the wheel to be held without turning, a moderate and stable steering performance is obtained in a stage in which an operating angle of the steering operation member is small, and then a highly responsive steering performance is obtained in a stage in which the operating angle of the steering operation member is large. That is, in the vehicle equipped with the "steering-force transmitting apparatus" described in this mode (0), it is possible to provide an operation feeling to the vehicle operator who operates the steering operation member, without provision of a so-called VGRS (Variable Gear Ratio Steering) system, i.e., a system configured to change a ratio of an amount of turning of the wheel to an amount of operation of the steering operation member, depending on an actuator such as an electromagnetic motor.

The "radially extending portion" described in this mode (0) may be provided in a part or parts of an outer circumferential surface of the second-shaft side end portion of the first main body portion, without extending in a circumferential direction of the first shaft throughout 360°, or may be provided in an entirety of the outer circumferential surface of the second-shaft side end portion of the first main body portion, so as to extend in the circumferential direction throughout 360°. In the latter case, the radially extending portion may be, for example, an annular-shaped flange portion. Further, the "radially projecting portion" described in this mode (0) may be provided in a part or parts of an outer circumferential surface of the second-shaft side end portion of the second main body portion, without extending throughout 360° in a circumferential direction of the second shaft, or may be provided in an entirety of the outer circumferential surface of the second-shaft side end portion of the second main body portion, so as to extend throughout 360° in the circumferential direction. In the latter case, the radially projecting portion may be, for example, an annular-shaped flange portion. It is noted that the above-described one of the axially opposite end portions of the turning-device-side shaft and the wheel turning device may be connected to each other either directly or via a suitable member such as an intermediate shaft and a universal joint, and that the above-described one of the axially opposite end portions of the operating-member-side shaft and the steering operation member may be connected to each other either directly or via a suitably member such as an intermediate shaft and a universal joint.

(1) The steering-force transmitting apparatus according to mode (0), wherein the first main body portion has axially opposite ends such that one of the axially opposite ends of the first main body portion is a second-shaft side end of the first main body portion that is closer to the second shaft than the other of the axially opposite ends of the first main body portion, wherein the radially extending portion, which is provided on the second-shaft side end portion of the first main body portion, is located in an axially shifted position that is shifted from the second-shaft side end of the first main body portion, in a direction which is away from the second shaft and which is parallel to the axial direction, wherein the second shaft has axially opposite ends such that one of the axially opposite ends of the second shaft is a first-shaft side end of the second shaft that is closer to the first shaft than the other of the axially opposite ends of the second shaft, wherein the axial end surface of the radially projecting portion constitutes a surface of the first-shaft side end of the second shaft, and wherein the second-shaft side end of the first main body portion is located between the first-shaft side end of the second shaft and the one of the axially opposite end portions of the second shaft in the axial direction.

The rotation transmitting mechanism is constructed such that the axially protruding portion projects in the axial direction from the radially extending portion that is provided in one of the above-described two shafts, and is held in engagement with the radially extending groove that is provided in the other of the above-described two shafts. In the thus constructed rotation transmitting mechanism, for example, the axially protruding portion may be a cylindrical-shaped portion, and may be rotatably provided in the radially extending portion, so that the axially protruding portion can be smoothly rolled and moved within the radially extending groove, thereby making it possible to smoothly transmit rotation from one of the two shafts to the other of the two shafts. In the steering-force transmitting apparatus equipped with such a rotation transmitting mechanism, the axially protruding portion and the radially projecting portion are required to be provided in the first shaft and the second shaft, respectively. Therefore, the steering-force transmitting apparatus equipped with the above-described rotation transmitting mechanism, as compared with a steering-force transmitting apparatus not equipped with the rotation transmitting mechanism, could have a large length as measured in its axial direction. Where the steering-force transmitting apparatus has a large length, the apparatus has difficulty in being installed onto a vehicle, since a space available for the installation of the apparatus in the vehicle is limited.

Further, there is a case where the steering-force transmitting apparatus is equipped with a so-called power steering device, i.e., an assisting device configured to assist the wheel to be turned. It is common that the power steering device is configured to generate an assisting force whose amount is dependent on an amount of twisting deformation of a torsion bar that is included in one of the two shafts which is constituted by at least two parts (that include the torsion bar). The torsion bar is required to have a certain length in view of a required degree of stiffness of the torsion bar, so that it is not desirable to reduce the length of the above-described one of the two shafts in the axial direction. Therefore, in the steering-force transmitting apparatus equipped with the rotation transmitting mechanism, it is desirable to reduce the length of the steering-force transmitting apparatus, without reducing the length of each of the two shafts.

In the light of what is described above, in the steering-force transmitting apparatus according to this mode (1), an axially end portion of the main body portion of one of the two shafts and an axially end portion of the other of the two shafts overlap with each other in the above-described axial direction. More specifically, the second-shaft side end of the first main body portion is located between the first-shaft side end of the second shaft and the above-described one of the axially opposite end portions of the second shaft in the axial direction, namely, the second-shaft side end of the first main body portion is located on one of opposite sides of the first-shaft side end of the second shaft, which one is closer to the above-described one of the axially opposite end portions of the second shaft than the other of the opposite sides in the axial direction, so that the axially end portion of the first main body portion and the axially end portion of the second shaft overlap with each other in the axial direction. This arrangement makes it possible to reduce the entire axial length of the apparatus as measured in the axial direction without reducing the length of each of the two shafts, and accordingly to improve installability of the apparatus onto the vehicle. It is noted that the above-described one of the axially opposite end portions of the second shaft may be referred to as an operating-member-side end portion of the second shaft where the second shaft is provided by the operating-member-side shaft, and that the above-described one of the axially opposite end portions of the second shaft may be referred to as a turning-device-side end portion of the second shaft where the second shaft is provided by the turning-device-side shaft.

(2) The steering-force transmitting apparatus according to mode (1), wherein the second shaft has a recess that opens in the axial end surface of the radially projecting portion, and wherein the second-shaft side end portion of the first main body portion is accommodated in the recess of the second shaft.

In the apparatus according to this mode (2), the second shaft has the cavity or recess that opens in the axial end surface of the radially projecting portion, and the first main body portion is accommodated, at its second-shaft side end portion, in the recess. This arrangement makes it possible to reduce the entire axial length of the steering-force transmitting apparatus by an amount corresponding to a length of the second-shaft side end portion (which is accommodated in the recess) of the first main body portion as measured in the axial direction.

(3) The steering-force transmitting apparatus according to mode (2), wherein the radially extending groove has a proximal end as one of radially opposite ends thereof which is closer to the axis of the second shaft than the other of the radially opposite ends, and wherein the radially extending groove is connected at the proximal end thereof to the recess.

(4) The steering-force transmitting apparatus according to mode (3), wherein the recess has a depth that is the same as a depth of the radially extending groove, as measured in the axial direction.

In the steering-force transmitting apparatus according to each of the above two modes (3) and (4), the radially extending groove and the recess are constructed as described above. In the apparatus according to each of the above two modes, the radially extending groove and the recess can have simplified constructions which permit the radially extending groove and the recess to be easily formed in the second shaft. That is, the simplification of constructions of the radially extending groove and the recess is advantageous for the formation of the radially extending groove and the recess in the second shaft.

(5) The steering-force transmitting apparatus according to any one of modes (0) to (4), further including a housing that is fixed to a part of a body of the vehicle such that the first shaft is supported, at at least two supported portions thereof that are distant from each other in the axial direction, by the housing, wherein the radially extending portion is an annular-shaped flange portion which is fixed to the first main body portion and is coaxial with the first main body portion, and wherein the radially extending portion corresponds to one of the at least two supported portions of the first shaft, and has an outer circumferential surface at which the first shaft is rotatably supported by the housing.

For enabling the first shaft to be rotatably supported by the housing, at least two bearings have to be fitted on an outer circumferential surface of the first shaft main body portion. Due to the limited space available for the installation of the steering-force transmitting apparatus on the vehicle, there is a limitation on the length of the first shaft, and the limitation on the length of the first shaft leads to a limitation on the length of the first main body portion. It is therefore desirable that the number of the bearings is small, and it is possible to increase a degree of freedom in designing the steering-force transmitting apparatus, by reducing the number of the bearings provided on the outer circumferential surface of the first main body portion.

In the steering-force transmitting apparatus according to this mode (5), the annular-shaped flange portion as the radially extending portion is rotatably supported by the housing, so that at least one bearing is fitted on the outer circumferential surface of the first main body portion, namely, so that the number of bearing fitted on the outer circumferential surface of the first main body portion may be only one. It is therefore possible to reduce the number of the bearings provided on the outer circumferential surface of the first main body portion, and accordingly to reduce a space required for provision of the bearings on the outer circumferential surface of the first main body portion. That is, it is possible to reduce an area of a portion of the outer circumferential surface of the first main body portion, which portion is required for provision of the bearing. The reduction of the area of the required portion of the outer circumferential surface of the first main body portion leads to increase of the degree of freedom in designing the steering-force transmitting apparatus. Specifically described, for example, the length of the steering-force transmitting apparatus in the axial direction can be reduced by an amount corresponding to the reduction of the area of the required portion of the outer circumferential surface of the first main body portion. Further, the reduction of the area of the required portion of the outer circumferential surface of the first main body portion is advantageous, for example, in an arrangement in which the axially protruding portion is press-fitted in a hole provided in the radially extending portion, so as to be provided in the radially extending portion. That is, in this arrangement, it is possible to increase a length of a fitted portion of the axially protruding portion (which is fitted in the hole provided in the radially extending portion), by increasing a length of the radially extending portion in the axial direction by the amount corresponding to the reduction of the area of the required portion of the outer circumferential surface of the first main body portion. The increase of the fitted portion of the axially protruding portion leads to increase of rigidity by which the axially protruding portion is held by the radially extending portion. It is noted that the apparatus according to this mode (5) is advantageous for an arrangement in which the apparatus is constituted as a steering column since the first shaft is rotatably supported by the housing.

The "housing" described in this mode (5) may be configured to rotatably support not only the first shaft but also the second shaft. Further, the housing may constitute a part of the wheel turning device or a part of the steering column.

(6) The steering-force transmitting apparatus according to mode (5), wherein the first main body portion has axially opposite ends such that one of the axially opposite ends of the first main body portion is a second-shaft side end of the first main body portion that is closer to the second shaft than the other of the axially opposite ends of the first main body portion, wherein the second shaft has axially opposite ends such that one of the axially opposite ends of the second shaft is a first-shaft side end of the second shaft that is closer to the first shaft than the other of the axially opposite ends of the second shaft, wherein the radially extending portion, which is provided in the second-shaft side end portion of the first main body portion, is located in an axially shifted position that is shifted from the second-shaft side end of the first main body portion, in a direction which is away from the second shaft and which is parallel to the axial direction, and wherein the second-shaft side end of the first main body portion is located between the first-shaft side end of the second shaft and the one of the axially opposite end portions of the second shaft in the axial direction.

(7) The steering-force transmitting apparatus according to mode (6), wherein the second shaft has a recess that opens in the axial end surface of the radially projecting portion, and wherein the second-shaft side end portion of the first main body portion is accommodated in the recess of the second shaft.

In the steering-force transmitting apparatus according to each of the above two modes (6) and (7), the first and second shafts are positioned relative to each other such that an axially end portion of the first main body portion and an axially end portion of the second shaft overlap with each other in the axial direction, so that it is possible to reduce the entire axial length of the steering-force transmitting apparatus. In this arrangement, however, a component such as the radially extending portion and bearing cannot be provided in an outer circumferential surface of the axially end portion of the first main body portion, which overlaps with the second shaft in the axial direction. That is, in this arrangement, as compared with an arrangement in which an axial end of the first main body portion and an axial end of the second shaft are opposed to each other with a small spacing distance therebetween, the component such as the radially extending portion and bearing is difficult to be disposed on an outer circumferential surface of the first main body portion, resulting in limitation on the degree of freedom in designing the steering-force transmitting apparatus. However, owing to the above-described arrangement in which the annular-shaped flange portion as the radially extending portion is rotatably supported by the housing, it is possible to reduce the space required for provision of the bearings on the outer circumferential surface of the first main body portion. Therefore, in the apparatus according to each of the modes (6) and (7), it is possible to reduce the entire axial length of the apparatus without reducing the degree of freedom in designing the apparatus.

(8) The steering-force transmitting apparatus according to any one of modes (0) to (7), wherein the first main body portion is a hollow portion having a space extending along the axis of the first shaft, and wherein the first shaft has a torsion bar which is disposed in the space and which has an axial end portion as one of axially opposite end portions thereof, the axial end portion of the torsion bar being unrotatably held by the second-shaft side end portion of the first main body portion such that the torsion bar is twistable by a rotational force that is applied to the first shaft, and the steering-force transmitting apparatus further including: an assisting device configured to generate, based on an amount of twisting deformation of the torsion bar, an assisting force that assists the wheel to be turned.

In the steering-force transmitting apparatus according to this mode (8), there is provided the assisting device such as a so-called power steering device. In a steering-force transmitting apparatus provided with a power steering device, there is a case where a torsion bar is coaxially provided in one of the operating-member-side shaft and turning-device-side shaft, and the power steering device generates a wheel-turning assisting force such that an amount of the generated assisting force is dependent on an amount of twisting deformation of the torsion bar. The torsion bar is required to have a certain length in view of a required degree of stiffness of the torsion bar, so that it is not desirable to reduce the length of the above-described one of the two shafts (in which the torsion bar is coaxially provided). It is therefore preferable that the two shafts are positioned relative to each other such that the two shafts at least partially overlap with each other in the axial direction, so as to make it possible to reduce the entire axial length of the apparatus without reducing the length of each of the shafts. This technical advantage is enjoyable particularly in the apparatus according to this mode (8).

(9) The steering-force transmitting apparatus according to mode (8), wherein the first shaft is the turning-device-side shaft while the second shaft is the operating-member-side shaft.

It is not desirable that the wheel-turning assisting force generated by the assisting device is applied to the rotation transmitting mechanism, in view of load applied to the engaging portion or other components of the rotation transmitting mechanism in case of application of the generated assisting force to the rotation transmitting mechanism, because the generated assisting force is considerably large. In the steering-force transmitting apparatus according to this mode (9) in which the wheel-turning assisting force is not applied to the rotation transmitting mechanism, the load applied to the rotation transmitting mechanism can be reduced whereby durability of the rotation transmitting mechanism can be improved.

(10) The steering-force transmitting apparatus according to mode (8) or (9), wherein the first main body portion includes first and second hollow shafts which are rotatable relative to each other while maintaining a coaxial relationship between the first and second hollow shafts, wherein the first and second hollow shafts cooperate with each other to define the space in the first main body portion, and wherein the axial end portion of the torsion bar as the one of the axially opposite end portions of the torsion bar is unrotatably held by the first hollow shaft, while another end portion of the torsion bar as the other of the axially opposite end portions of the torsion bar is unrotatably held by the second hollow shaft.

(11) The steering-force transmitting apparatus according to mode (10), further including a housing that is fixed to a part of a body of the vehicle such that the first shaft is supported, at at least two supported portions thereof that are distant from each other in the axial direction, by the housing, wherein the radially extending portion is an annular-shaped flange portion which is fixed to the first hollow shaft and is coaxial with the first hollow shaft, wherein the radially extending portion corresponds to one of the at least two supported portions of the first shaft, and has an outer circumferential surface at which the first shaft is rotatably supported by the housing, and wherein the second hollow shaft includes a supported portion which corresponds to another one of the at least two supported portions of the second shaft, the supported portion of the second hollow shaft having an outer circumferential surface at which the first shaft is rotatably supported by the housing.

In the steering-force transmitting apparatus according to each of the above two modes (10) and (11), the first main body portion is constituted by the two hollow shafts and the torsion bar wherein the two hollow shafts are disposed coaxially with each other and rotatably relative to each other while the torsion bar is disposed inside the two hollow shafts. Where the first main body portion is thus constituted by the plurality of pieces, the two hollow shafts have to be rotatably held by the housing so that the number of bearings disposed on an outer circumferential surface of the first main body portion is likely to be larger than where the first main body portion is constituted by a single piece. Therefore, the technical advantage provided by the above-described arrangement in which the annular-shaped flange portion as the radially extending portion is rotatably supported by the housing, is enjoyable particularly in the apparatus according to each of the above two modes (10) and (11).

(12) The steering-force transmitting apparatus according to mode (10) or (11), wherein the first shaft is the turning-device-side shaft while the second shaft is the operating-member-side shaft, and wherein the assisting device is configured to apply the assisting force to the second hollow shaft.

A worm wheel or the like is required to be provided on an outer circumferential surface of the second hollow shaft, for causing the wheel-turning assisting force (generated by the assisting device) to be applied to the second hollow shaft. That is, the worm wheel requires a space available for the provision of the worm wheel on the outer circumferential surface of the first main body portion. Therefore, the technical advantage provided by the above-described arrangement in which the annular-shaped flange portion as the radially extending portion is rotatably supported by the housing, is enjoyable particularly in the apparatus according to this mode (12).

(13) The steering-force transmitting apparatus according to any one of modes (0) to (12), wherein the radially extending groove is defined by a pair of side wall surfaces which extend in the radial direction of the second shaft and which are opposed to each other, and wherein the axially protruding portion engaged in the radially extending groove is interposed between the pair of side wall surfaces, so as to limit displacement of the axially protruding portion in a circumferential direction of the second shaft.

In the steering-force transmitting apparatus according to this mode (13) in which the radially extending groove is constructed as specified in this mode (13), the axially protruding portion can be guided in the radial direction of the second shaft as a result of rotation of the second shaft.

(14) The steering-force transmitting apparatus according to mode (13), wherein the axially protruding portion includes a roller which is interposed between the side wall surfaces and which is rollable so as to be moved within the radially extending groove.

In the steering-force transmitting apparatus according to this mode (14) in which the axially protruding portion is constructed as specified in this mode (14), the axially protruding portion can be moved along the pair of side wall surfaces, without play of the axially protruding portion in the circumferential direction of the second shaft. It is therefore possible to smoothly transmit the rotation of the operating-member-side shaft to the turning-device-side shaft.

(15) The steering-force transmitting apparatus according to mode (14), wherein the second shaft has axially opposite ends such that one of the axially opposite ends of the second shaft is a first-shaft side end of the second shaft that is closer to the first shaft than the other of the axially opposite ends of the second shaft, wherein the radially extending portion has a hole which has an opening facing the surface of the first-shaft side end of the second shaft and which is located in the non-central position, wherein the axially protruding portion includes a pin which has a fitted portion and an axially projecting portion, such that the fitted portion is fixedly fitted in the hole, and such that the axially projecting portion projects from the radially extending portion in the direction which is toward the second shaft and which is parallel to the axial direction, and wherein the roller is rotatably held by the axially projecting portion of the pin.

The rotation of the operating-member-side shaft is transmitted to the turning-device-side shaft via the axially protruding portion. The axially protruding portion receives a relatively large load that is applied thereto by rotation of the operating-member-side shaft. In the steering-force transmitting apparatus according to this mode (15), the pin included in the axially protruding portion is fixedly fitted in the hole that is provided in the radially extending portion. For reliably maintaining fixation of the pin in the hole in spite of the large load applied to the axially protruding portion, it is preferable that the fitted portion of the pin has a large axial length. In the above-described arrangement in which the annular-shaped flange portion as the radially extending portion is rotatably supported by the housing, it is possible to reduce an area of a portion of the outer circumferential surface of the first main body portion, which portion is required for provision of the bearings. The radially extending portion can have an axial length that is increased by an amount corresponding to the reduction of the area of the required portion of the outer circumferential surface of the first main body portion, whereby the axial length of the fitted portion of the pin can be increased. Therefore, the technical advantage provided by the above-described arrangement in which the annular-shaped flange portion as the radially extending portion is rotatably supported by the housing, is enjoyable particularly in the apparatus according to this mode (15).

BRIEF DESCRIPTION OF DRAWINGS

The above and other objects, features, advantages and technical and industrial significance of the present invention will be better understood by reading the following detailed description of presently preferred embodiments of the invention, when considered in connection with the accompanying drawings, in which.

BEST MODE FOR CARRYING OUT THE INVENTION

There will be described an embodiment of the present invention, by reference to the accompanying drawings. It is to be understood that the present invention is not limited to the following embodiment, and may be otherwise embodied with various changes and modifications, such as those described in the foregoing "MODES OF THE INVENTION", which may occur to those skilled in the art. It is noted that, in the following descriptions, the terms "front" and "rear" will be used to be interpreted as front and rear, respectively, as viewed in a direction of forward running of a vehicle.

First Embodiment

1. Overall Construction of Steering System

Figure 1:
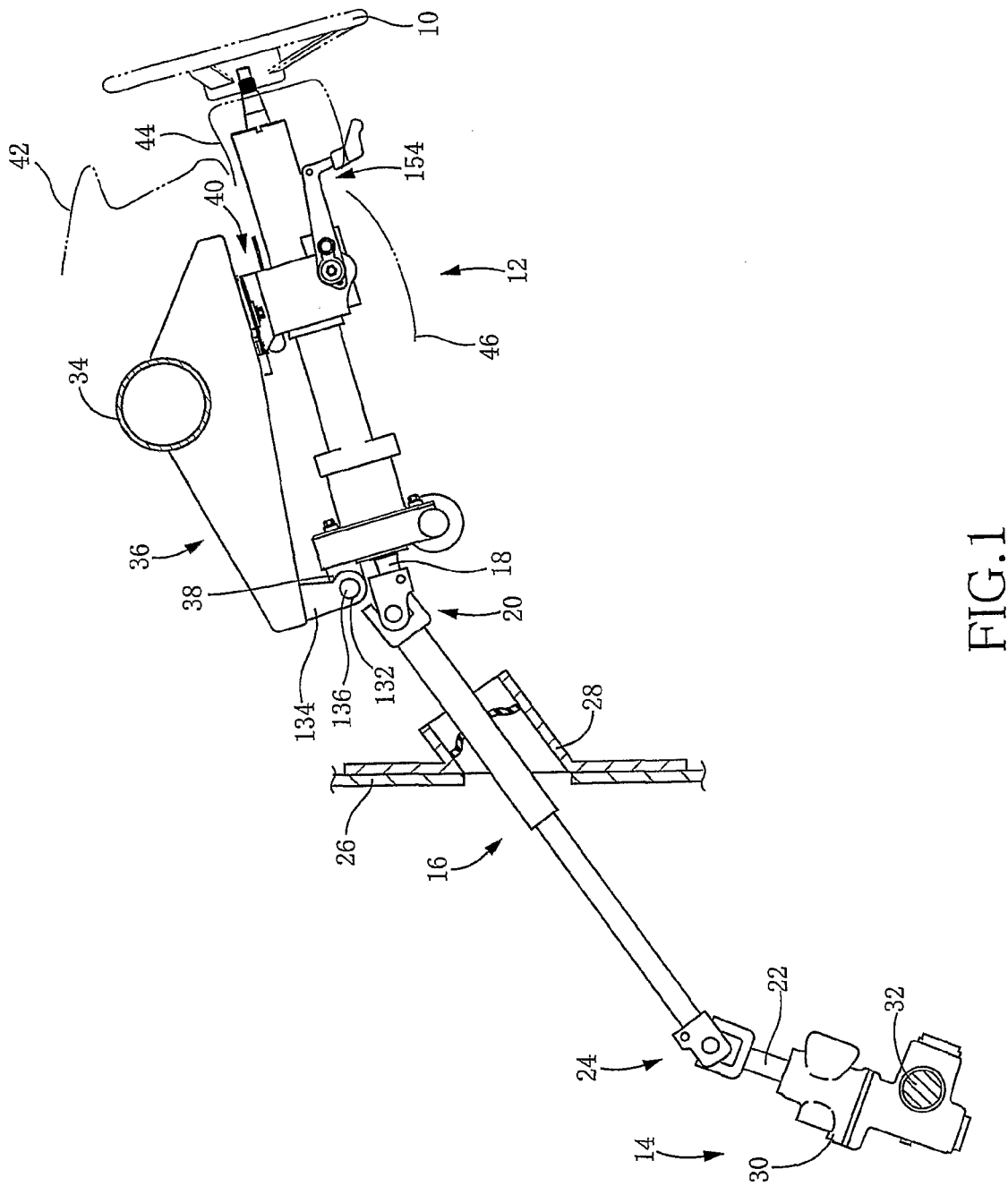
FIG. 1 is a view schematically showing a vehicle steering system provided with a steering-force transmitting apparatus that is constructed according to a first embodiment of the claimable invention.

FIG. 1 shows an overall construction of a vehicle steering system that is to be installed on a vehicle. The vehicle steering system is provided with a steering-force transmitting apparatus that is constructed according to a first embodiment of the invention. The present steering system includes: a steering wheel 10 as a steering operation member operable by an operator of the vehicle; a steering-force transmitting apparatus 12; a wheel turning device 14 configured to turn wheels of the vehicle; and an intermediate shaft 16 that is disposed between the steering-force transmitting apparatus 12 and the wheel turning device 14. The steering wheel 10 is held by an axial end portion of the steering-force transmitting apparatus 12. A universal joint 20 is provided to interconnect an axial end portion of the intermediate shaft 16 and an output shaft 18 that is included in the steering-force transmitting apparatus 12. Meanwhile, another universal joint 24 is provided to interconnect another axial end portion of the intermediate shaft 16 and an axial end portion of an input shaft 22 of the wheel turning device 14.

The present vehicle steering system is installed on the vehicle such that its portion closer to the steering wheel 10, i.e., its right-side portion as seen in FIG. 1 is located on a rear side of its portion closer to the wheel turning device 14, i.e., left-side portion as seen in FIG. 1. The intermediate shaft 16 passes through a through-hole formed through a dash panel 26 which separates an engine room and a passenger compartment from each other. A boot 28 is provided to cover a portion of the intermediate shaft 16 whose portion is adjacent to the through-hole of the dash panel 26.

The wheel turning device 14 includes a housing 30 and a steering rod 32 configured to steer the wheels, in addition to the above-described input shaft 22. The steering rod 32 is held by the housing 30 such that the steering rod 32 extends in a lateral direction of the vehicle and such that the steering rod 32 is movable in its axial direction. The steering rod 32 is connected at its axially opposite end portions to respective steering knuckles (not shown) that hold the respective right and left front wheels. Meanwhile, the input shaft 22 is rotatably held by the housing 30, and is held in engagement with the steering rod 32 inside the housing 30. A pinion (not shown) is provided in a front or lower end portion of the input shaft 22, and meshes with a rack (not shown) that is provided in an axially intermediate portion of the steering rod 32, so that the input shaft 22 and the steering rod 32 are held in engagement with each other.

The steering-force transmitting apparatus 12 is constituted as a so-called steering column, and is fixedly supported by a part of a body of the vehicle, via a steering support 36 that is provided on an instrument panel reinforcement 34 of the vehicle. The steering-force transmitting apparatus 12, which is thus supported by the part of the vehicle body, is arranged such that a front side portion of the apparatus 12 is located on a lower side of a rear side portion of the apparatus 12, as shown in FIG. 1. A front bracket 38 and a breakaway bracket 40 are provided in the steering-force transmitting apparatus 12 such that the front bracket 38 is located on a front side of the breakaway bracket 40 while the breakaway bracket 40 is located on a rear side of the front bracket 38. The front bracket 38 and the breakaway bracket 40 are attached to the steering support 36 whereby the steering-force transmitting apparatus 12 is supported at its two portions by the part of the vehicle body. The supported steering-force transmitting apparatus 12 has a rear end portion which protrudes from an instrument panel 42 in a rearward direction, such that the steering wheel 10 is attached to a rearmost end of the rear end portion of the apparatus 12. A column cover 44 is provided to cover a majority of the rear end portion of the steering-force transmitting apparatus 12, which protrudes from the instrument panel 42. Further, an instrument panel lower cover 46 is provided to cover a lower portion of the rear end portion of the steering-force transmitting apparatus 12.

Figure 2:
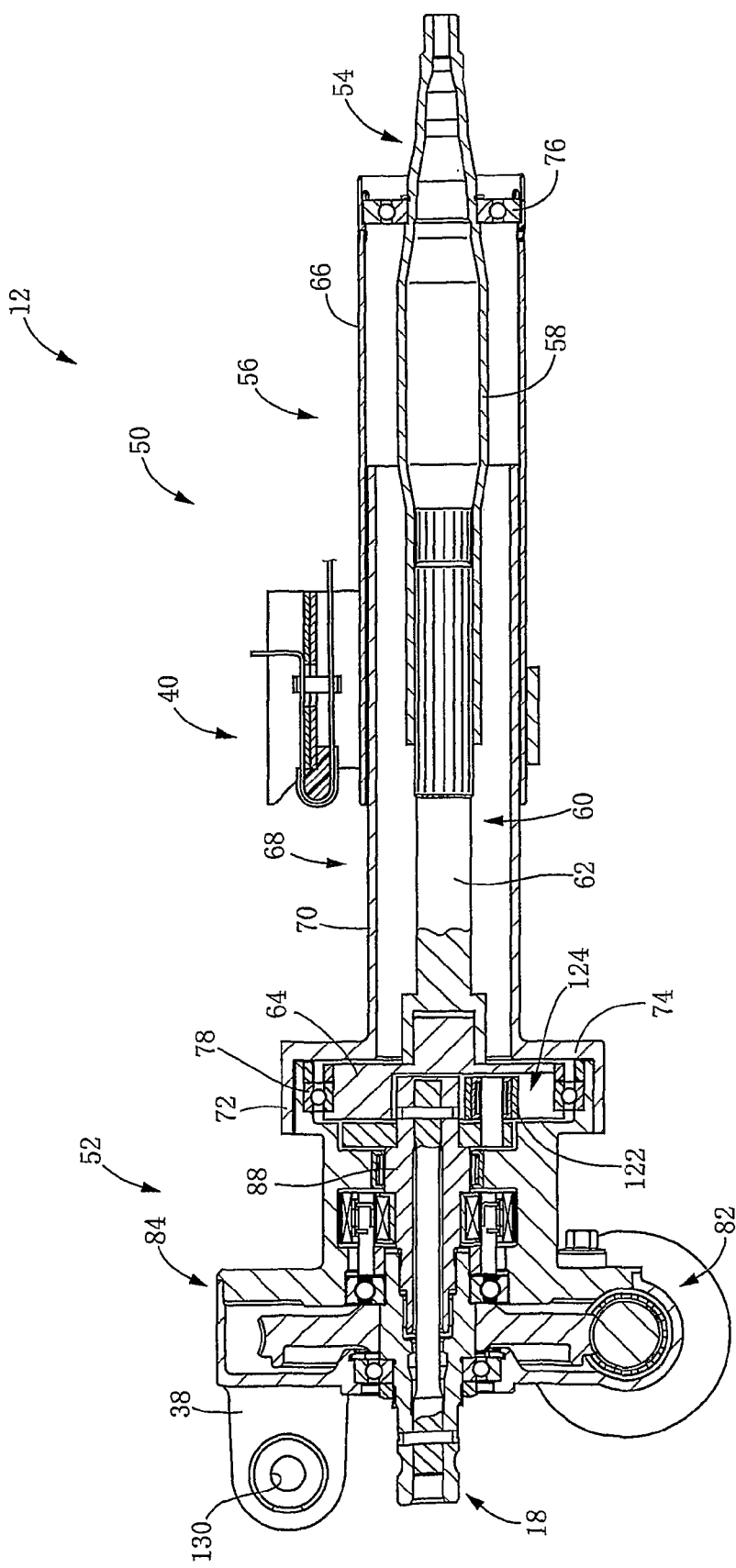
FIG. 2 is a cross sectional view showing the steering-force transmitting apparatus that is provided in the vehicle steering system of FIG. 1.

FIG. 2 is an axially cross-sectional view of the steering-force transmitting apparatus 12. The steering-force transmitting apparatus 12 can be sectioned into a column section 50 and an EPS section 52. The column section 50 holds the steering wheel 10, and is extensible and contractible in its axial direction. The EPS section 52 is a main section configured to achieve an electric power steering function. The two sections 50, 52, which are integral with each other, will be described.

The column section 50 includes an operating-member-side shaft in the form of a main shaft 54 and a tubular-shaped housing in the form of a column tube 56. The main shaft 54 has a rear end portion (as one of its axially opposite end portions) to which the steering wheel 10 is fixedly connected, so that the main shaft 54 serves as the operating-member-side shaft that holds the steering wheel 10. The main shaft 54 is introduced in the column tube 56, and is rotatably held by the column tube 56, so that the column tube 56 serves as the tubular-shaped housing that rotatably holds the main shaft 54. The main shaft 54 includes an upper shaft 58 and a lower shaft 60 such that the upper shaft 58 is provided by a rear or upper portion of the main shaft 54 while the lower shaft 60 is provided by a front or lower portion of the main shaft 54. The upper shaft 58 is a tube shaft while the lower shaft 60 is a solid shaft. A rear end portion of the lower shaft 60 is introduced in a front end portion of the upper shaft 58. The upper shaft 58 has a splined inner circumferential surface while the lower shaft 60 has a splined outer circumferential surface, so that the upper and lower shafts 58, 60 are held in spline engagement with each other. Thus, the upper and lower shafts 58, 60, which are connected to each other, are movable in the axial direction relative to each other and unrotatable relative to each other, so that the main shaft 54 is extensible and contractible in its axial direction. The lower shaft 60 includes a lower-shaft main body portion 62 and a circular-shaped flange portion 64 as a radially projecting portion. The lower-shaft main body portion 62 is provided by a rear or upper portion of the lower shaft 60. The flange portion 64 is provided by a front or lower portion of the lower shaft 60, so as to be located on a front or lower side of the lower-shaft main body portion 62. The flange portion 64 as the radially projecting portion has an outside diameter that is larger than an outside diameter of the lower-shaft main body portion 62. The lower shaft 60 is connected at the circular-shaped flange portion 64 to the EPS section 52 that will be described later in detail. In the present steering-force transmitting apparatus 12, the lower-shaft main body portion 62 of the lower shaft 60 cooperates with the upper shaft 58 to constitute a main body portion of the main shaft 54.

The column tube 56 includes an upper tube 66 as a first tubular member and a lower tube 68 as a second tubular member, such that the upper tube 66 is located on a rear or upper side of the lower tube 68 and such that the lower tube 68 is located on a front or lower side of the upper tube 66, and such that a rear end portion of the lower shaft 60 is introduced in a front end portion of the upper shaft 58. The lower tube 68, which is thus fitted in the upper tube 66, is a stepped tube having a small diameter portion 70, a large diameter portion 72 and a stepped portion 74 that interconnects the small and large diameter portions 70, 72. The small diameter portion 70 has an outside diameter smaller than an inside diameter of the upper tube 66, and is provided by a rear or upper portion of the lower tube 68. The large diameter portion 72 has an outside diameter larger than the inside diameter of the upper tube 66, and is provided by a front or lower portion of the lower tube 68. A liner (not shown) is provided between the small diameter portion 70 of the lower tube 68 and the upper tube 66. Owing to the provision of the liner, the lower tube 68 is fitted in the upper tube 66 without play between the two tubes 66, 68, and the upper and lower tubes 66, 68 are easily movable relative to each other. Thus, the column tube 56 is adapted to be extensible and contractible in the axial direction.

Radial bearings 76, 78 are provided in a rear end portion of the upper tube 66 and a front end portion of the lower tube 68, respectively, so that the main shaft 54 is rotatably supported by the column tube 56 via the bearings 76, 78. Thus, the column section 50 as a whole is extensible and contractible while permitting rotation of the main shaft 54.

Figure 3:
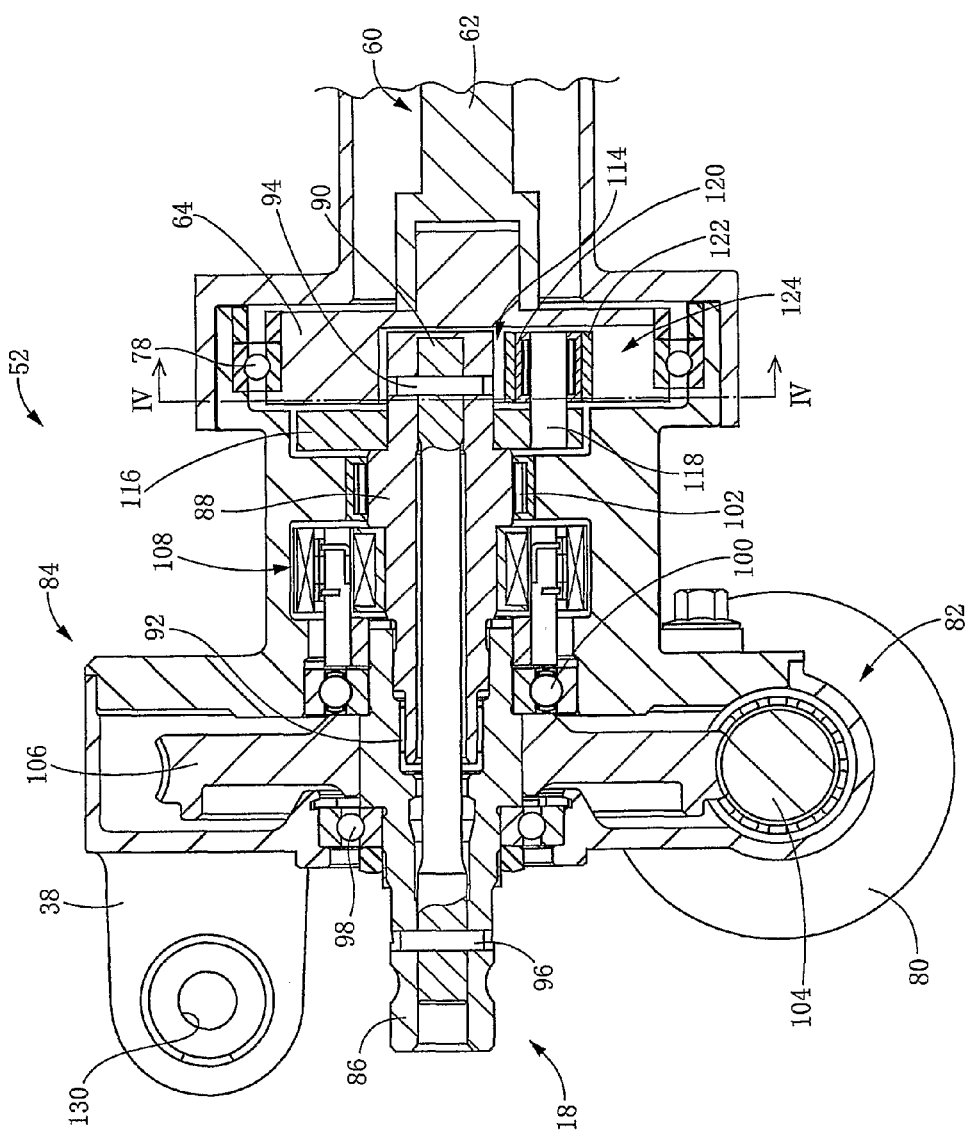
FIG. 3 is a cross sectional view showing an EPS section that is provided in the steering-force transmitting apparatus.

FIG. 3 shows an axially cross-sectional view of the EPS section 52, which includes an assisting device 82 and an EPS housing 84 in addition to the output shaft 18. The output shaft 18 is configured to output an operating force applied to the steering wheel 10, whereby the operating force is transmitted to the wheel turning device 14 via the output shaft 18. The assisting device 82 has an electromagnetic motor 80 as a power source, and is configured to assist a rotational output of the output shaft 18, owing to activation of the motor 80. The EPS housing 84 rotatably holds the output shaft 18, and accommodates the assisting, device 82 therein. The output shaft 18 includes an output-side shaft 86 as a second hollow shaft, an input-side shaft 88 as a first hollow shaft and a torsion bar 90 that are integral with each other. The output-side shaft 86 includes a projecting portion projecting from a front portion of the EPS housing 84, and is connected at the projecting portion thereof to the intermediate shaft 16 via the universal joint 20, so as to transmit rotation to the wheel turning device 14.

The input-side shaft 88 is introduced in a rear portion of the output-side shaft 86 that is a hollow shaft. A bearing 92 is interposed between an inner circumferential surface of the output-side shaft 86 and an outer circumferential surface of the input-side shaft 88, whereby the output-side shaft 86 and the input-side shaft 88 are rotatable relative to each other while maintaining a coaxial relationship. The input-side shaft 88 has a blind hole which extends in the axial direction and which opens in a front-side one of axially opposite end surfaces of the input-side shaft 88. The output-side shaft 86 has a through-hole which extends in the axial direction. The torsion bar 90 is disposed in a space which is provided by cooperation of the blind hole of the input-side shaft 88 and the through-hole of the output-side shaft 86, namely, which is defined by cooperation of the output-side shaft 86 and the input-side shaft 88. An axial end portion of the torsion bar 90 is fixed to a bottom portion of the blind hole of the input-side shaft 88 via a pin 94. Another axial end portion of the torsion bar 90 is fixed to a front end portion of the through-hole of the output-side shaft 86 via a pin 96. Owing to such a construction, the output shaft 18 allows twisting deformation of the torsion bar 90, and the output shaft 18 as a whole is allowed to be twisted by an amount corresponding to an amount of the twisting deformation of the torsion bar 90. The output-side shaft 86 is rotatably held at its outer periphery by the EPS housing 84 via two radial bearings 98, 100. The input-side shaft 88 is rotatably held at its outer periphery by the EPS housing 84 via a needle bearing 102.

The assisting device 82 includes a worm 104 and a worm wheel 106 in addition to the above-described electromagnetic motor 80. The worm 104 is connected to a motor shaft of the electromagnetic motor 80, and meshes with the worm wheel 106. The worm wheel 106 is fixed to the output-side shaft 86 of the output shaft 18, so as to be unrotatable relative to the output-side shaft 86. Owing to such a construction, a rotational force is applied from the electromagnetic motor 80 to the worm wheel 106 via the worm 104. That is, the assisting device 82 is configured to cause the electromagnetic motor 80 to generate a wheel-turning assisting force (that may be referred also to as "steering assisting force") that is to assist a rotational output of the output shaft 18 so as to assist the wheels to be turned.

The EPS section 52 includes a rotational angle sensor 108 configured to detect a relative rotational displacement amount that is a difference between a rotational angular position of the output-side shaft 86 (to which the above-described another axial end portion of the torsion bar 90 is fixed) and a rotational angular position of the input-side shaft 88 (to which the above-described axial end portion of the torsion bar 90 is fixed). It is therefore possible to estimate a steering torque, based on the difference between the rotational angular position of the output-side shaft 86 and the rotational angular position of the input-side shaft 88. The electromagnetic motor 80 is controlled so as to generate the wheel-turning assisting force such that an amount of the generated wheel-turning assisting force is dependent on an amount of the steering torque.

The output shaft 18 is connected to a front end portion of the main shaft 54, such that a rotation axis of the output shaft 18 and a rotation axis of the main shaft 54 are parallel to each other, and are offset from each other by a predetermined offset distance d. Described in detail, the lower shaft 60, which constitutes a part of the main shaft 54, has a recess 114 that opens in a surface of a front end of the circular-shaped flange portion 64, and a rear end portion of the input-side shaft 88, which constitutes a part of the output shaft 18, is accommodated in the recess 114. An annular-shaped plate 116 as a radially extending portion is fixedly fitted on the input-side shaft 88, and is located in an axially shifted position that is shifted from a rear end of the input-side shaft 88, in a forward direction, i.e., in a direction away from the main shaft 54. The annular-shaped plate 116 has a rear end surface which is opposed to the surface of the front end of the circular-shaped flange portion 64, with a small clearance defined therebetween, as shown in FIG. 3.

The annular-shaped plate 116 has a through-hole extending in the axial direction and located in a non-central position that is deviated or distant from a rotation axis of the output shaft 18 in a radial direction of the output shaft 18 by a deviation distance L larger than the above-described predetermined offset distance d. The through-hole of the annular-shaped plate 116 receives a pin 118 including a fitted portion that is fixedly fitted in the through-hole. The pin 118 includes, in addition to the fitted portion, an axially projecting portion that projects from the annular-shaped plate 116 in a rearward direction, i.e., in a direction toward the main shaft 54. A cylindrical-shaped roller 122 is mounted on the axially projecting portion of the pin 118, with a needle bearing 120 being interposed between the roller 122 and the axially projecting portion of the pin 118. In the present steering-force transmitting apparatus 12, the pin 118, needle bearing 120 and roller 122 cooperate with one another to constitute an axially protruding portion that protrudes from the annular-shaped plate 116 in a direction parallel to a rotation axis of the input-side shaft 88. The axially protruding portion cooperates with the output shaft 18 and the annular-shaped plate 116, so as to constitute a turning-device-side shaft serving as a first shaft. A main body portion of the turning-device-side shaft is constituted by the input-side shaft 88 and output-side shaft 86. The main shaft 54 as the operating-member-side shaft serves as a second shaft.

Figure 4:
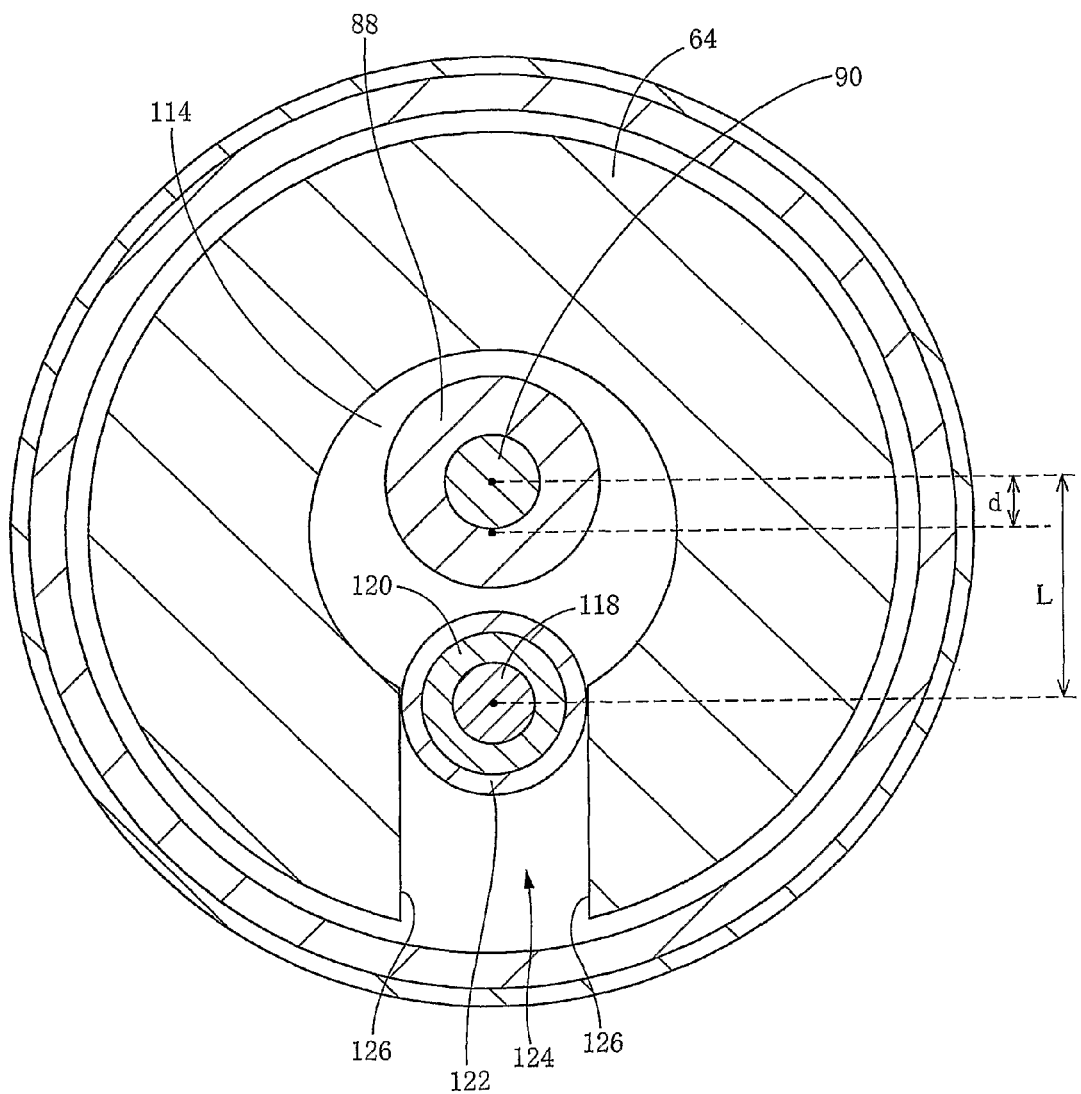
FIG. 4 is a cross sectional view taken along line IV-IV of FIG. 3.

The circular-shaped flange portion 64 has a radially extending groove 124 located in a position that is opposed to the roller 122 projecting backwardly. The groove 124 has an opening that opens in a front end surface of the flange portion 64. As shown in FIG. 4 that is a cross sectional view taken along line IV-IV of FIG. 3, the groove 124 is formed to extend from the recess 114 in a radial direction of the main shaft 54, and to have a width slightly larger than an outside diameter of the roller 122, as measured in a circumferential direction of the main shaft 54. The roller 122 is engaged in the groove 124 whereby the input-side shaft 88, i.e., the output shaft 18 is connected to the lower shaft 60 that constitutes a part of the main shaft 54. The groove 124 has a depth that is substantially the same as a depth of the recess 114 (that is also formed in the flange portion 64), as measured in the axial direction of the main shaft 54. It is noted that, in the present steering-force transmitting apparatus 12, the axially protruding portion constituted by cooperation of the pin 118, needle bearing 120 and roller 122 serves as an engaging portion.

The main shaft 54 is rotated about its rotation axis when the steering wheel 10 is operatively rotated by the operator of the vehicle. In this instance, the roller 122, which is engaged in the radially extending groove 124 provided in the circular-shaped flange portion 64 of the lower shaft 60, is limited by a pair of side wall surfaces 126 of the radially extending groove 124, from being displaced in a circumferential direction of the lower shaft 60, but is allowed to be displaced in a radial direction of the lower shaft 60. That is, the pair of side wall surfaces 126 serve as a pair of guide surfaces, so that the groove 124 serves as a guide passage. When the roller 122 is moved in the groove 124 as a result of rotation of the lower shaft 60, the rotational force is transmitted from the lower shaft 60 to the input-side shaft 88 via components such as the roller 122, pin 118 and annular-shaped plate 116, whereby the input-side shaft 88 is rotated about its rotation axis. Thus, the steering-force transmitting apparatus 12 is equipped with a rotation transmitting mechanism that is configured to transmit the rotation of the lower shaft 60 about its rotation axis to the input-side shaft 88, whereby the input-side shaft 88 is rotated about its rotation axis that is offset from the rotation axis of the lower shaft 60 by a predetermined offset distance. Owing to such a construction, the steering-force transmitting apparatus 12 is configured to transmit a steering force that is applied to the steering wheel 10, to the wheel turning device 14 via components such as the intermediate shaft 16. It is noted that, in the present steering-force transmitting apparatus 12, the rotation transmitting mechanism is constituted by cooperation of the radially extending groove 124, roller 122, pin 118 and needle bearing 120.

The steering-force transmitting apparatus 12 is attached at a front end portion of the EPS section 52 and the upper tube 66 of the column section 50, to a part of the vehicle body. The above-described front bracket 38 is fixedly disposed in the EPS housing 84 of the EPS section 52. The front bracket 38 has a shaft receiving hole 130 (see FIG. 2). A shaft receiving member 134 having a shaft receiving hole 132 is fixed to the steering support 36 (see FIG. 1), so that the steering-force transmitting apparatus 12 is held by the part of the vehicle body and is pivotable about a support shaft 136 that is introduced in the shaft receiving hole 130 of the front bracket 38 and the shaft receiving hole 132 of the shaft receiving member 134.

Figure 5:
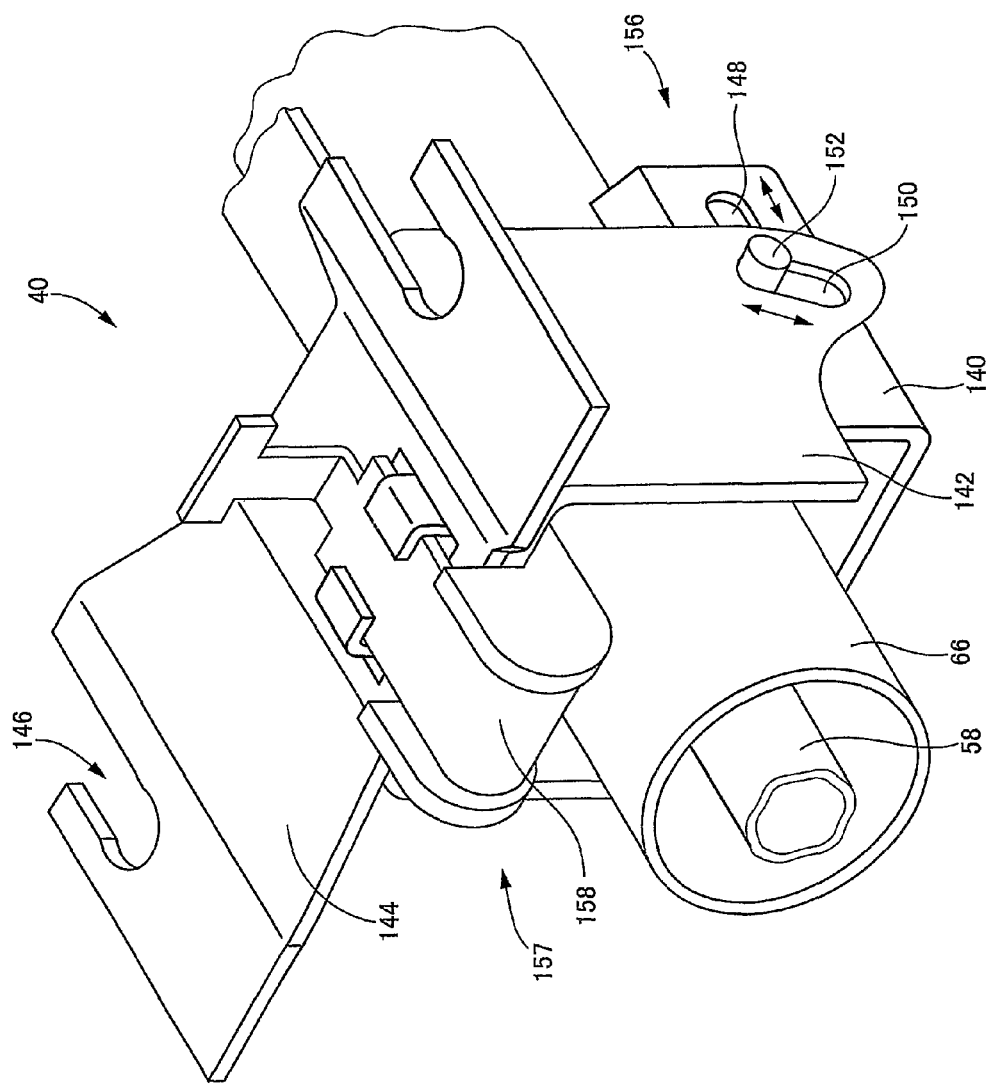
FIG. 5 is a perspective view showing a breakaway bracket holding a column section that is provided in the steering-force transmitting apparatus.

Meanwhile, the column section 50 is held by the breakaway bracket 40 that is attached to the steering support 36. Described more in detail, as shown in FIG. 5, the breakaway bracket 40 includes an inverted U-shaped holding member 142 and an attachment plate 144. The holding member 142 is provided to hold a tube receiving member 140 that is fixed to the upper tube 66. The attachment plate 144 is fixed to the holding member 142, and is attached to the steering support 36. The breakaway bracket 40 is fastened to the steering support 36, by using slots 146 that are provided in the attachment plate 144. The tube receiving member 140 and the inverted U-shaped holding member 142 have elongated holes 148, 150, respectively. The tube receiving member 140 is gripped by the inverted U-shaped holding member 142, by using a rod 152 that extends through the elongated holes 148, 150. The tube receiving member 140 is gripped by the holding member 142 by a gripping force, by which the upper tube 66 is inhibited from being displaced. The gripping force can be reduced by operating an operating lever 154. When the gripping force is reduced by operation of the operating lever 154, the rod 152 is allowed to be moved along the elongated hole 148 and also along the elongated hole 150. As the rod 152 is allowed to be moved along the elongated hole 148, the upper tube 66 is allowed to be moved relative to the lower tube 68 in the axial direction, together with movement of the upper shaft 58 relative to the lower shaft 60 in the axial direction, whereby the column section 50 as a whole is allowed to be extended and contacted. Meanwhile, as the rod 152 is allowed to be moved along the elongated hole 150, the steering-force transmitting apparatus 12 is allowed to be pivoted about the support shaft 136 that is introduced in the front bracket 38. Thus, the present steering-force transmitting apparatus 12 is equipped with a tilt/telescopic mechanism 156 that is constructed as described above.

In the event of a secondary collision between the operator of the vehicle and the steering wheel 10 which could occur as a result of a primary collision between the vehicle and another object, the breakaway bracket 40 is removed from the steering support 36, and the column section 50 is contracted. The steering-force transmitting apparatus 12 is provided with an impact absorbing mechanism 157 that is configured to absorb an impact caused by the secondary collision. The impact of the secondary collision is effectively absorbed by causing an EA plate (U-shaped plate) 158 to be deformed together with contraction of the steering column 56.

2. Function of Rotation Transmitting Mechanism

In the present steering-force transmitting apparatus 12, the two shafts 60, 88 are positioned relative to each other such that axes of the respective two shafts 60, 88 are offset from each other, and are connected to each other through the rotation transmitting mechanism. Owing to this offset arrangement, a rotational phase of the lower shaft 60 and a rotational phase of the input-side shaft 88 are offset from each other, such that a rotational phase difference between the rotational phases of the respective two shafts 60, 88 is changeable.

Figure 6:
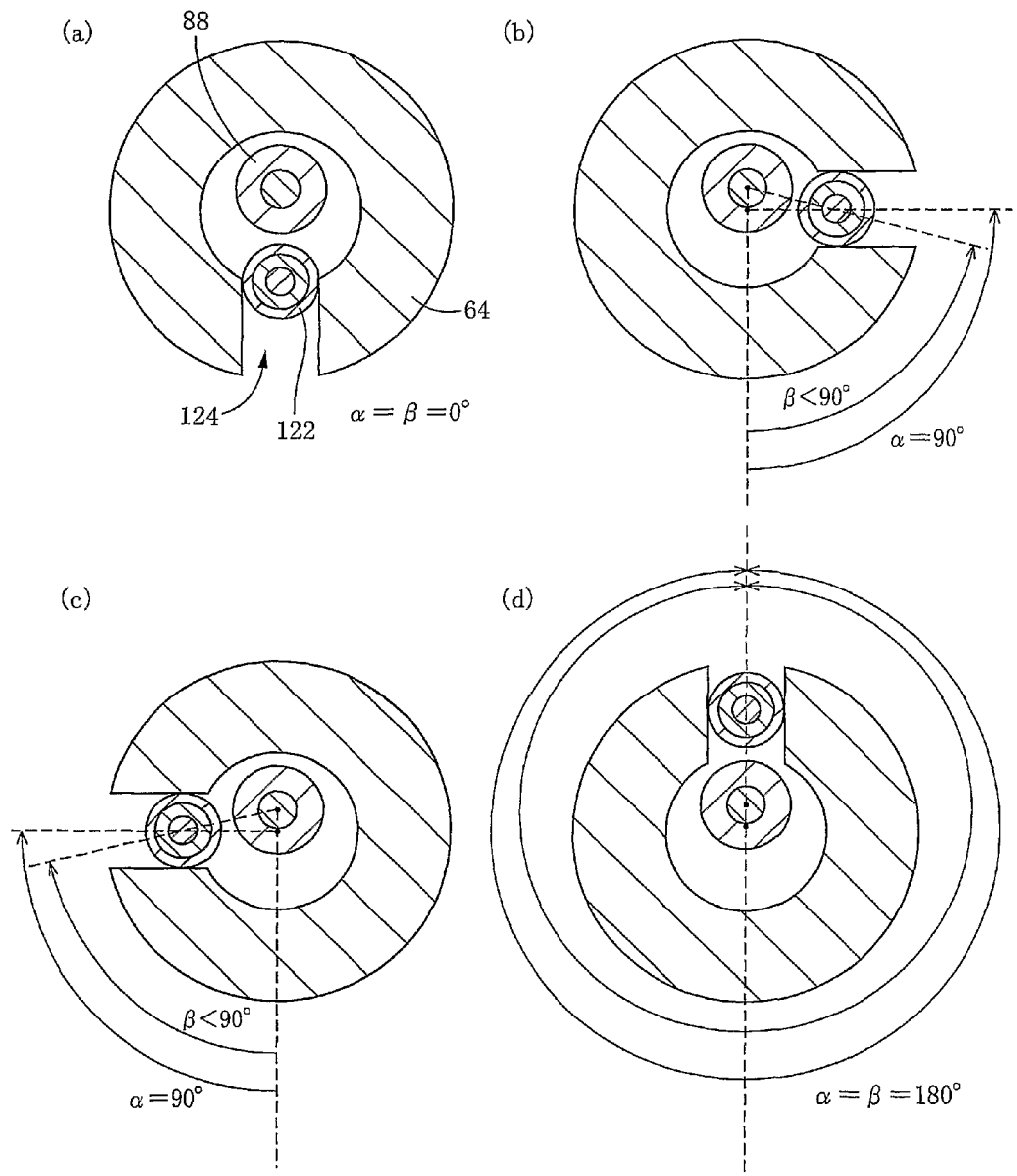
FIG. 6 is a set of cross sectional views taken along line IV-IV of FIG. 3 and showing four stages in operation of a steering wheel.

FIG. 6 is a set of cross sectional views (a)-(d) taken along line IV-IV of FIG. 3 and showing the circular-shaped flange portion 64 of the lower shaft 60, the input-side shaft 88 connected to the flange portion 64, and the roller 122 engaged in the radially extending groove 124 that is formed in the flange portion 64. The view (a) of FIG. 6 shows a stage in which the steering wheel 10 is positioned in its neutral operating position that causes the wheels to be held without turning. The view (b) of FIG. 6 shows a stage in which the steering wheel 10 has been operatively rotated by 90° in counterclockwise direction from the neutral operating position. The view (c) of FIG. 6 shows a stage in which the steering wheel 10 has been operatively rotated by 90° in clockwise direction from the neutral operating position. The view (d) of FIG. 6 shows a stage in which the steering wheel 10 has been operatively rotated by 180° in clockwise or counterclockwise direction from the neutral operating position.

Figure 7:
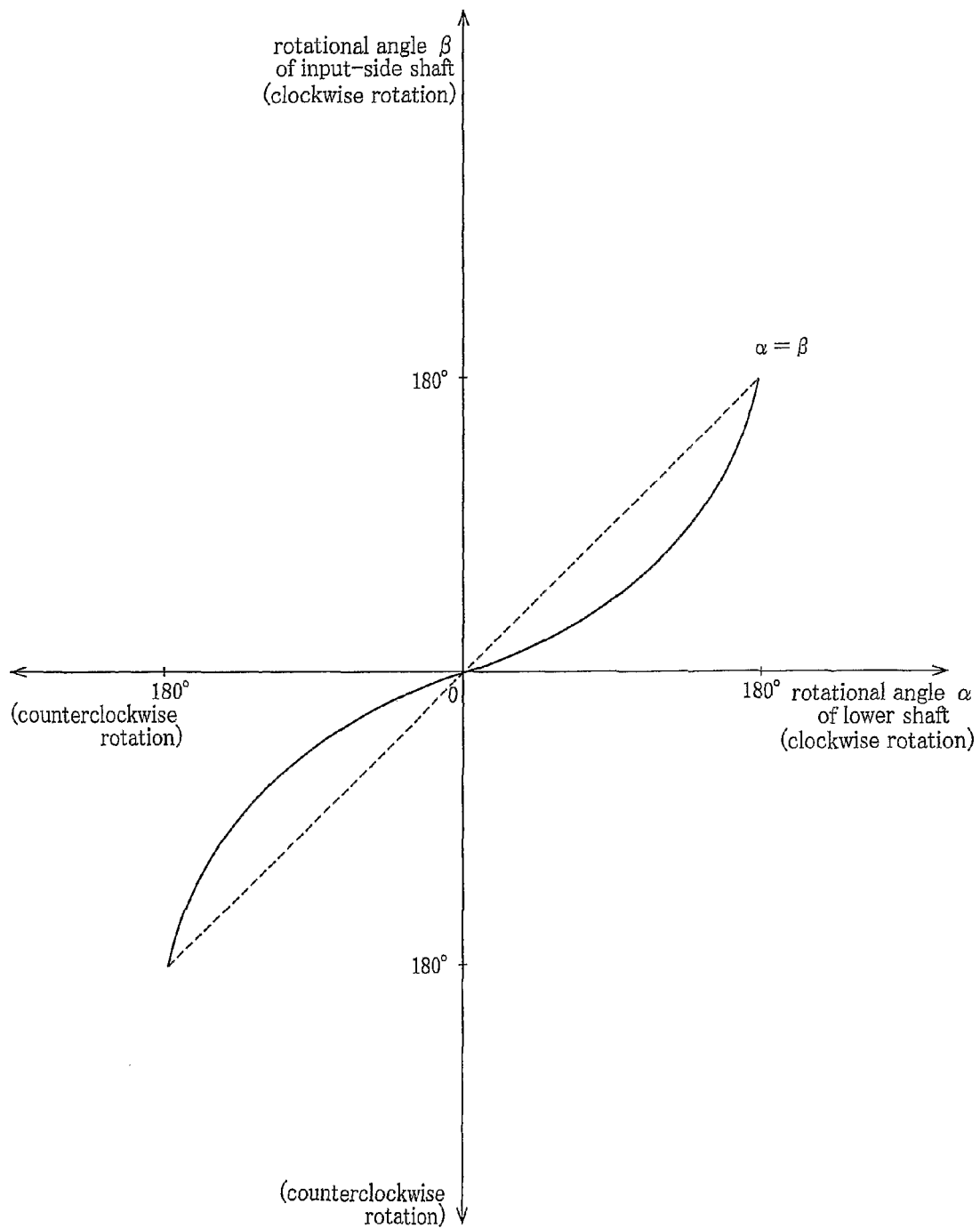
FIG. 7 is a graph showing a relationship between a rotational angle of an operating-member-side shaft and a rotational angle of a turning-device-side shaft.

As is understood from the views (a)-(d) of FIG. 6, when the steering wheel 10 is rotated by 90° in clockwise or counterclockwise direction from the neutral operating position, the lower shaft 60 is rotated about its rotation axis by 90° while the input-side shaft 88 is rotated about its rotation axis by an amount smaller than 90°. When the steering wheel 10 is rotated by 180° in clockwise or counterclockwise direction from the neutral operating position, the lower shaft 60 and the input-side shaft 88 are both rotated by 180°. FIG. 7 shows a relationship between a rotational angle α of the lower shaft 60 and a rotational angle β of the input-side shaft 88. As is apparent from FIG. 7, when the steering wheel 10 is rotated from the neutral operating position by an amount smaller than 180°, the rotational angle β of the input-side shaft 88 is smaller than the rotational angle α of the lower shaft 60. When the steering wheel 10 is rotated from the neutral operating position by 180°, the rotational angle β of the input-side shaft 88 becomes equal to the rotational angle α of the lower shaft 60. That is, when the rotational angle α of the lower shaft 60 is 0° or 180°, namely, when the rotational phase of the lower shaft 60 is either one of two predetermined values which cause the rotational phase of the lower shaft 60 and the rotational phase of the input-side shaft 88 to coincide with each other, the rotational angle α of the lower shaft 60 and the rotational angle β of the input-side shaft 88 are equalized to each other whereby the rotational phase difference becomes zero. As shown in FIG. 7, during change of the rotational angle α of the lower shaft 60 from 0° to 180°, the rotational phase difference is gradually increased until the rotational angle α of the lower shaft 60 becomes a certain value, and is then gradually reduced to zero after the angle α of the lower shaft 60 becomes the certain value. When the rotational angle α of the lower shaft 60 becomes 180°, the rotational phase difference becomes zero. During the change of the rotational angle α of the lower shaft 60 from 0° to 180°, a gear ratio (dβ/dα) between angular speeds of the respective rotated two shafts, i.e., a ratio (dβ/dα) of a rotational speed (dβ/dt) of the input-side shaft 88 (as the turning-device-side shaft) to a rotational speed (dα/dt) of the lower shaft 60 (as the operating-member-side shaft) is changed depending on the rotational angle α of the lower shaft 60, as shown in FIG. 8.

Figure 8:
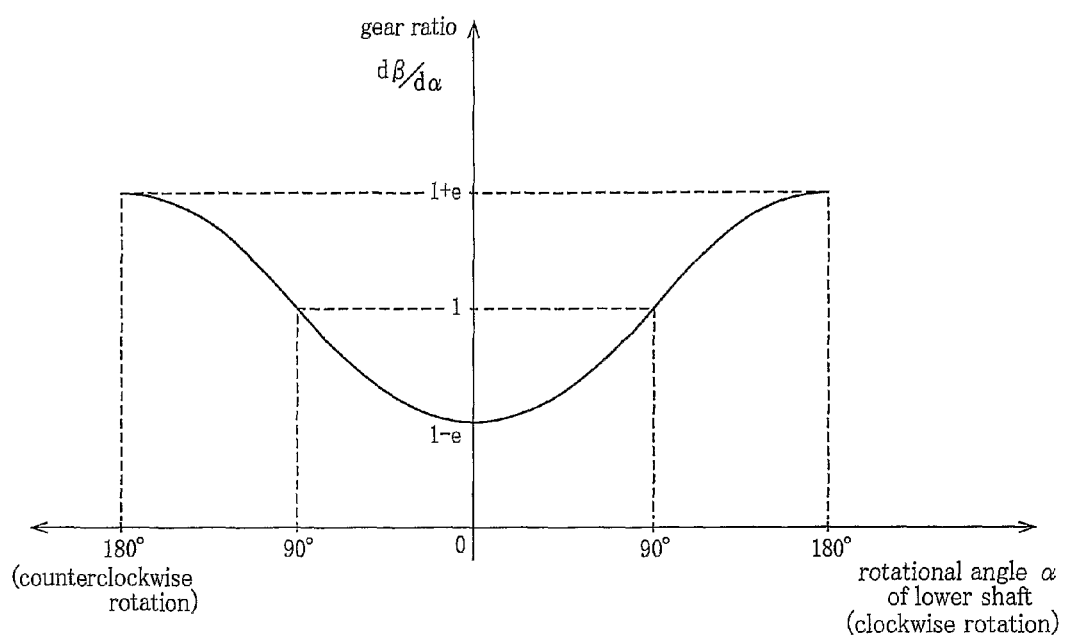
FIG. 8 is a graph showing a gear ratio of the turning-device-side shaft to the operating-member-side shaft, which is changed depending on a rotational angle of the operating-member-side shaft.

As is understood from FIG. 8, the gear ratio (dβ/dα) is minimized when the rotational angle α of the lower shaft 60 is 0°, and is increased with increase of the rotational angle α of the lower shaft 60. That is, in the present steering-force transmitting apparatus 12, a moderate and stable steering performance is obtained in a stage in which an operating angle of the steering wheel 10 is small, and then a highly responsive steering performance is obtained in a stage in which the operating angle of the steering wheel 10 is large. In other words, a degree of response of the steering performance is increased with increase of the operating angle of the steering wheel 10. It is noted that the present steering system is equipped with an operating range limiting mechanism (not shown) that is configured to limit a range of the operating angle of the steering wheel 10 such that the steering wheel 10 is allowed to be clockwise and counterclockwise rotated from the neutral operating position by 180° as an allowable maximum operating angle.

In graph of FIG. 8, an axis of ordinates represents the gear ratio (dβ/dα) as the ratio of the rotational speed of the input-side shaft 88 to the rotational speed of the lower shaft 60, wherein "e" represents a ratio of the above-described predetermined offset distance d (by which the axes of the respective input-side shaft 88 and lower shaft 60 are offset from each other, as shown in FIG. 4) to the deviation distance L (by which a position of the roller 122 engaged in the radially extending groove 124 is deviated or distant from the rotation axis of the input-side shaft 88, as shown in FIG. 4). An operation feeling provided to the vehicle operator who operates the steering wheel 10 varies depending on a value of this ratio e.

Figure 9:
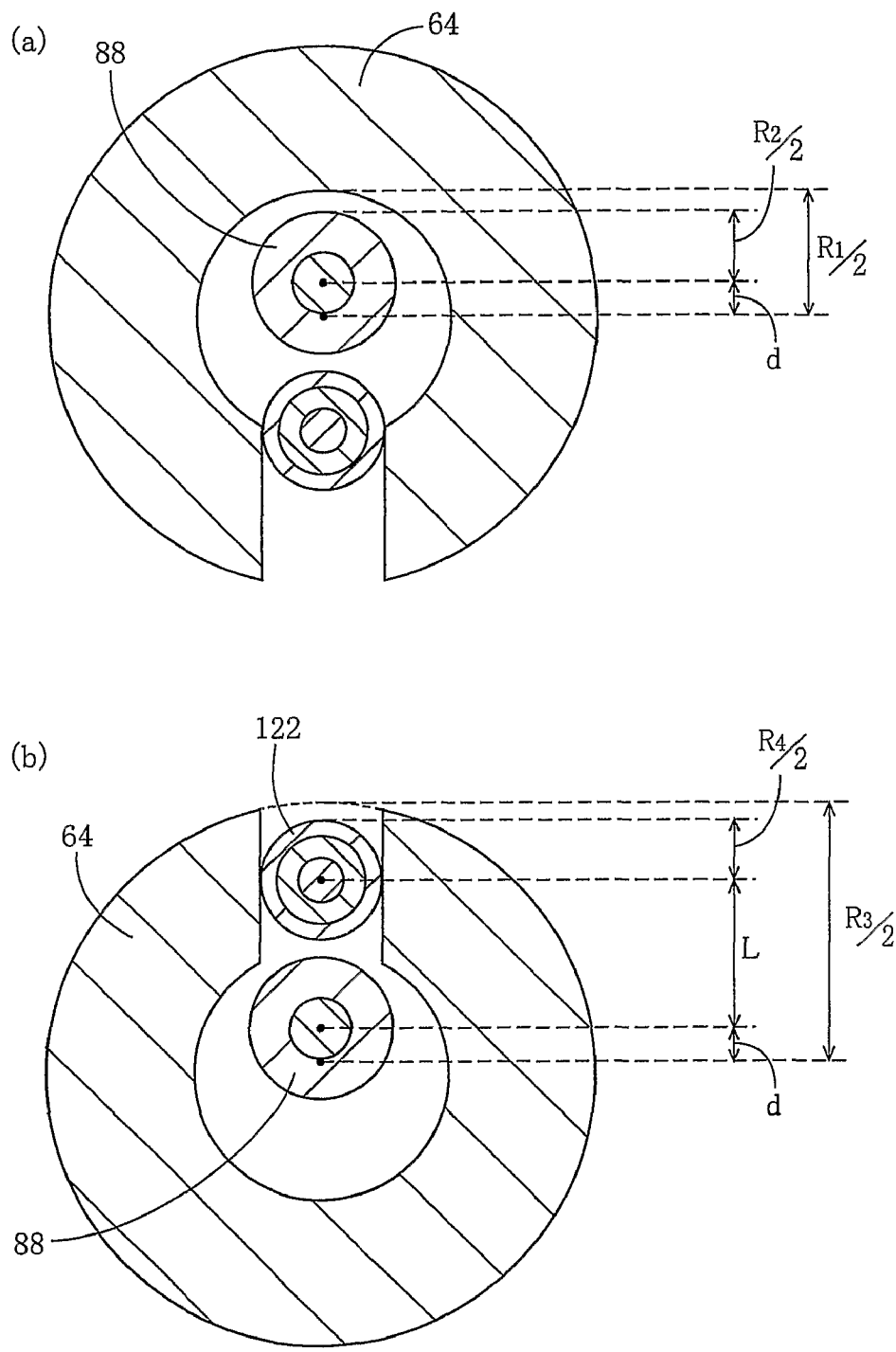
FIG. 9 is a set of cross sectional views taken along line IV-IV of FIG. 3 and showing inside and outside diameters of an annular-shaped flange portion of the operating-member-side shaft.

An inside diameter of the circular-shaped flange portion 64 of the lower shaft 60, i.e., a diameter of the recess 114 is a value that is determined for avoiding interference of the input-side shaft 88 with an inner circumferential surface of the flange portion 64 during operation of the steering wheel 10. Described specifically, as shown in view (a) of FIG. 9 corresponding to the view (a) of FIG. 6, the inside diameter R1 of the circular-shaped flange portion 64 is determined such that a half of the inside diameter R1 is larger than a sum of a half of an outside diameter R2 of the input-side shaft 88 and the above-described offset distance d (by which the axes of the respective two shafts 60, 88 are offset from each other). That is, the inside diameter R1 of the circular-shaped flange portion 64 is determined such that an expression (1) as follows is satisfied. In the present steering-force transmitting apparatus 12, the inside diameter R1 of the circular-shaped flange portion 64 is thus determined, for avoiding interference of the input-side shaft 88 with the inner circumferential surface of the circular-shaped flange portion 64 during operation of the steering wheel 10.

$$R1 > R2 + 2 \times d \tag{1}$$

Further, an outside diameter of the circular-shaped flange portion 64 of the lower shaft 60 is a value that is determined for avoiding the roller 122 from projecting radially outwardly from an outer circumferential surface of the flange portion 64, during operation of the steering wheel 10. Described specifically, as shown in view (b) of FIG. 9 corresponding to the view (d) of FIG. 6, the outside diameter R3 of the circular-shaped flange portion 64 is determined such that a half of the outside diameter R3 is larger than a sum of a half of an outside diameter R4 of the roller 122, the above-described offset distance d and the above-described deviation distance L (by which the position of the roller 122 is deviated or distant from the rotation axis of the input-side shaft 88). That is, the outside diameter R3 of the circular-shaped flange portion 64 is determined such that an expression (2) as follow is satisfied. In the present steering-force transmitting apparatus 12, the outside diameter R3 of the circular-shaped flange portion 64 is thus determined, for avoiding the roller 122 from projecting radially outwardly from the outer circumferential surface of the flange portion 64, during operation of the steering wheel 10.

$$R3 > R4 + 2 \times (d + L) \tag{2}$$

Figure 10:
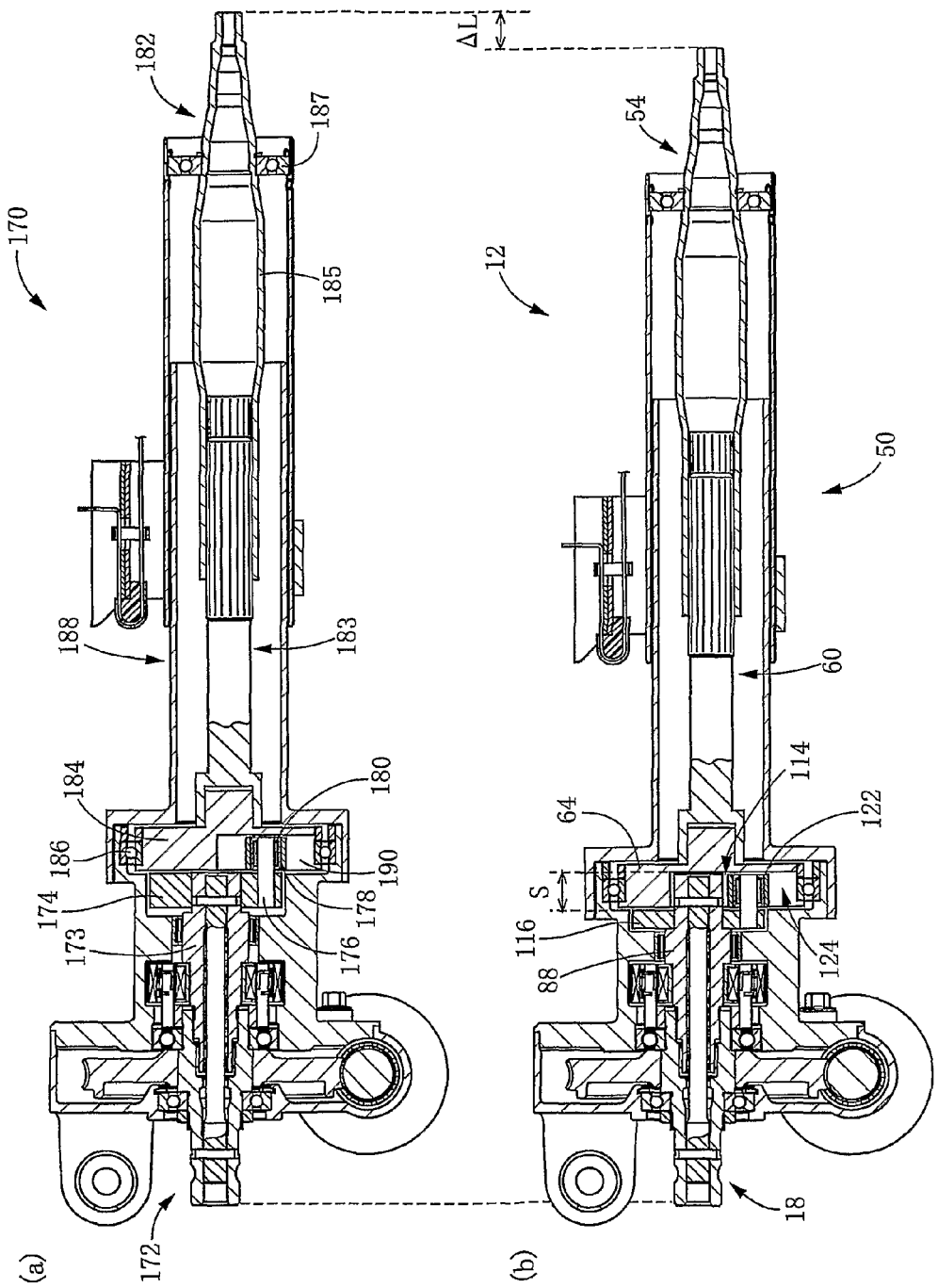
FIG. 10 is a set of views showing the steering-force transmitting apparatus according to the first embodiment, as compared with a steering-force transmitting apparatus as a comparative example.

3. Advantages of Present Steering-Force Transmitting Apparatus Over Other Steering-Force Transmitting Apparatus In the steering-force transmitting apparatus 12, a rear end of the input-side shaft 88 constituting a part of the main body portion of the turning-device-side shaft is located on a rear side of a front end of the main shaft 54 as the operatingmember-side shaft, in an axial direction that is parallel to the rotation axis of the output shaft 18 and the rotation axis of the main shaft 54, as shown in FIGS. 2 and 3. In other words, the rear end of the input-side shaft 88 is located between the front end of the main shaft 54 and the rear end portion of the main shaft 54 in the axial direction. It is noted that, in the present apparatus 12, the rear end of the input-side shaft 88 corresponds to a second-shaft side end of a first main body portion, while the front end of the main shaft 54 corresponds to a first-shaft side end of the second shaft. FIG. 10 is a set of views showing the steering-force transmitting apparatus 12 (in which the main shaft 54 and the output shaft 18 are positioned relative to each other as described above) and another steering-force transmitting apparatus 170 as a comparative example.

In the steering-force transmitting apparatus 170 shown in the view (a) of FIG. 10, a main shaft 182 and an output shaft 172 are positioned relative to each other such that a rear end of a main body portion of the output shaft 172 and a front end of the main shaft 182 are opposed to each other and spaced apart from each other by a small distance. In the apparatus 170, described in detail, an annular-shaped plate 174 is fixedly fitted on a rear end portion of an input-side shaft 173 that constitutes a part of the output shaft 172. A pin 176 is fixedly provided in the annular-shaped plate 174, so as to protrude in a rearward direction. A roller 180 is mounted on an axially projecting portion of the pin 176 with a needle bearing 178 interposed therebetween. A lower shaft 183 constituting a part of the main shaft 182 has a circular-shaped flange portion 184 that is located in a front end portion of the lower shaft 183. The main shaft 182 is rotatably supported, at the circular-shaped flange portion 184 and a rear end portion of an upper shaft 185 (that constitutes a part of the main shaft 182), by a housing 188 of the apparatus 170 via radial bearings 186, 187. A rear end surface of the annular-shaped plate 174 and a front end surface of the circular-shaped flange portion 184 of the lower shaft 183 are opposed to each other, and are spaced apart from each other by a small distance. A radially extending groove 190 is formed in the front end surface of the circular-shaped flange portion 184, and is located in a position opposed to the roller 180 that protrudes from the annular-shaped plate 174 in the rearward direction. The radially extending groove 190 extends from a center of the front end surface of the circular-shaped flange portion 184 in a radial direction of the flange portion 184, and has a width that is slightly larger than an outside diameter of the roller 180. With engagement of the roller 180 in the radially extending groove 190, the lower shaft 183 and the input-side shaft 173 are connected to each other, whereby the output shaft 172 is rotatable by rotation of the main shaft 182.

The two shafts 173, 183 are positioned relative to each other such that rotary axes of the respective two shafts 173, 183 are offset from each other by an offset distance that is equal to the above-described offset distance d (by which the rotary axes of the respective two shafts 60, 88 are offset from each other in the above-described steering-force transmitting apparatus 12). Further, a position of the roller 180 engaged in the radially extending groove 190 is deviated or distant from the rotary axis of the input-side shaft 173 by a deviation distance that is equal to the above-described deviation distance L (by which the position of the roller 122 engaged in the radially extending groove 124 is deviated or distant from the rotation axis of the input-side shaft 88 in the above-described steering-force transmitting apparatus 12). That is, the steering-force transmitting apparatus 170 is configured to provide the vehicle operator with substantially the same operation feeling as the above-described steering-force transmitting apparatus 12.

As is apparent from FIG. 10, the steering-force transmitting apparatus 12 has an entire axial length that is smaller than that of the steering-force transmitting apparatus 170 as the comparative example. A difference ΔL between the entire axial lengths of the respective apparatuses 12, 170 substantially corresponds to a distance S by which the output shaft 18 is introduced in the lower shaft 60 (more precisely, by which the output shaft 18 is accommodated in the recess 114) in the apparatus 12. Therefore, as compared with the apparatus 170 that provides substantially the same operation feeling as the apparatus 12, the apparatus 12 can be made compact in size as measured in the axial direction so that its installability onto the vehicle is improved.

The reduction of the entire axial length of the apparatus makes it possible to increase an entire axial length of the column section 50 by an amount corresponding to the above-described difference ΔL, and accordingly to increase a stroke distance by which the column section 50 is extensible and contractible. Therefore, the steering-force transmitting apparatus 12 constructed according to the first embodiment of the invention can have an increased capacity of absorbing an impact caused in the event of a secondary collision between the vehicle operator and the steering wheel 10.

Second Embodiment

There will be described a steering-force transmitting apparatus 200 that is constructed according to a second embodiment of the invention. The present steering-force transmitting apparatus 200 is provided with an EPS section 202 which is different in construction from the EPS section 52 provided in the above-described apparatus 12 constructed according to the first embodiment. The EPS section 202 has an EPS housing 204 in which the output shaft 18 is rotatably supported at their portions that are different from those in the above-described EPS housing 84 of the EPS section 52. Except for this different part of the EPS section, the steering-force transmitting apparatus 200 is substantially the same as the above-described apparatus 12. In the following description as to the apparatus 200 of this second embodiment, the same reference signs as used in the above-described apparatus 12 will be used to identify the functionally corresponding elements, and redundant description of these elements is not provided.

Figure 11:
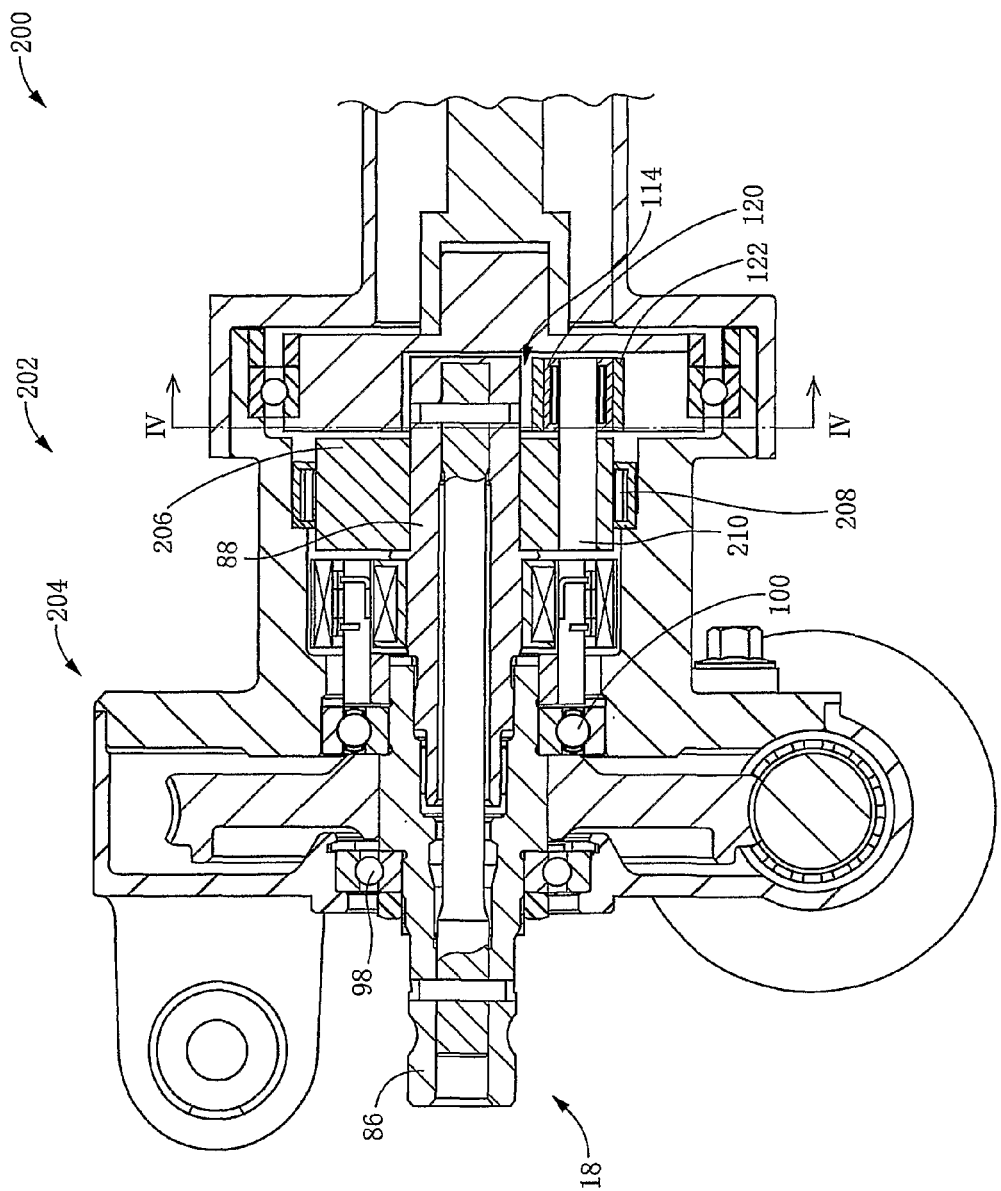
FIG. 11 is a cross sectional view showing an EPS section that is provided in a steering-force transmitting apparatus constructed according to a second embodiment of the claimable invention.

As shown in FIG. 11, unlike in the above-described EPS housing 84, in the EPS housing 204 of the EPS section 202 provided in the present steering-force transmitting apparatus 200, the output shaft 18 is rotatably supported at an outer circumferential surface of an annular-shaped plate 206 that is fitted on an axial end portion of the output shaft 18. Described more in detail, the apparatus 200 includes the annular-shaped plate 206 having an axial length larger than an axial length of the annular-shaped plate 116 of the apparatus 12 of the first embodiment. The annular-shaped plate 206 is fixedly mounted on a portion of the input-side shaft 88 that is located on a front side of an accommodated portion of the input-side shaft 88 accommodated in the recess 114. A needle bearing 208 is fitted on an outer circumferential surface of the annular-shaped plate 206 as the annular-shaped flange portion, so that the annular-shaped plate 206 is rotatably supported by the EPS housing 204 via the needle bearing 208. Meanwhile, radial bearings 98, 100 are fitted on an outer circumferential surface of the output-side shaft 86 constituting a part of the output shaft, so that the output-side shaft 86 is rotatably supported by the EPS housing 204 via the radial bearings 98, 100. In the annular-shaped plate 206 having the axial length larger than that of the annular-shaped plate 116, a pin 210 having an axial length larger than that of the above-described pin 118 is provided. Like the pin 118, the pin 210 includes a fitted portion fitted in the annular-shaped plate 206 and also an axially projecting portion projecting from the annular-shaped plate 206 in a rearward direction. The roller 122 is mounted on the axially projecting portion of the pin 210, with the needle bearing 120 being interposed between the roller 122 and the axially projecting portion of the pin 210.

Figure 12:
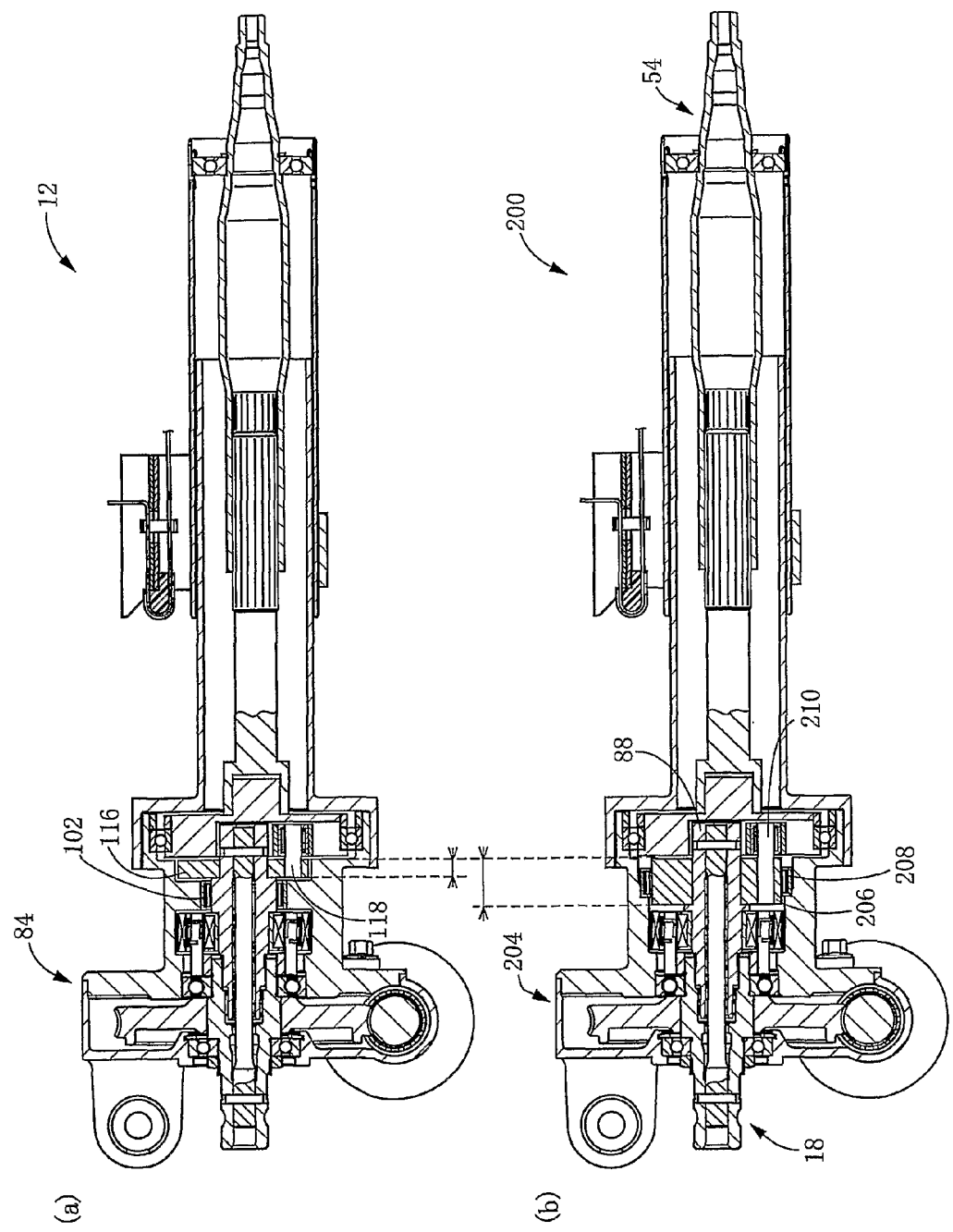
FIG. 12 is a set of views showing the steering-force transmitting apparatus according to the second embodiment, as compared with the steering-force transmitting apparatus according to the first embodiment.

In the present steering-force transmitting apparatus 200, the turning-device-side shaft is constituted by components such as the output shaft 18, roller 122 and annular-shaped plate 206, and is rotatably supported, at its supported portions in the form of a portion of the output-side shaft 86 and annular-shaped plate 206, by the EPS housing 204 via the bearings 98, 100, 208. On the other hand, in the steering-force transmitting apparatus 12 according to the above-described first embodiment, the turning-device-side shaft is rotatably supported, at its supported portions in the form of portions of the output-side shaft 86 and input-side shaft 88, by the EPS housing 84 via the bearings 98, 100, 102. FIG. 12 is a set of views wherein the apparatus 12 of the above-described first embodiment is shown in the view (a) while the apparatus 200 of the present second embodiment is shown in the view (b).

As is apparent from FIG. 12, the steering-force transmitting apparatus 200 has an entire axial length that is substantially equal to the entire axial length of the steering-force transmitting apparatus 12 of the above-described first embodiment. That is, like the apparatus 12, the present apparatus 200 also can be made compact in size as measured in the axial direction so that its installability onto the vehicle can be improved. Further, in the present apparatus 200, the needle bearing 208 is provided on the outer circumferential surface of the annular-shaped plate 206 rather than on the outer circumferential surface of the input-side shaft 88, and an axial length of the annular-shaped plate 206 is larger than that of the annular-shaped plate 116 of the apparatus 12 of the first embodiment. Therefore, the fitted portion of the pin 210 of the apparatus 200 is made larger in its axial length than the fitted portion of the pin 118 of the apparatus 12. A load acting on the pin 210 is relatively large since rotation of the main shaft 54 is transmitted to the output shaft 18 via the pin 210. In the present apparatus 200, the axial length of the fitted portion of the pin 210 (which portion is fitted in the annular-shaped plate 206) is made relatively large, so that the pin 210 can be reliably held by the annular-shaped plate 206 even when the load acting on the pin 210 is considerably increased, thereby increasing a reliability of the apparatus 200 as a whole.

Third Embodiment

It is preferable that the torsion bar included in the output shaft is as long as possible in view of its required stiffness. However, where the required stiffness can be obtained even with reduction of the axial length of the torsion bar, the axial length of the output shaft can be reduced by the reduction of the axial length of the torsion bar. Further, the entire axial length of the steering-force transmitting apparatus can be reduced by the reduction of the axial length of the output shaft. It is preferable to reduce the entire axial length of the steering-force transmitting apparatus in view of a limited space available for installation of the apparatus onto the vehicle. In the steering-force transmitting apparatus 12 of the first embodiment shown in view (a) of FIG. 12, the bearings 100, 102, rotational angle sensor 108 and worm wheel 106 are arranged with little clearance therebetween in a portion of the outer circumferential surface of the output shaft 18, which portion is located between the annular-shaped plate 116 and the bearing 98. In the apparatus 12, therefore, a portion of the output shaft 18, which projects from the EPS housing 84, is required to have a certain amount of the axial length. Further, it is not preferable to reduce the axial length of the annular-shaped plate 116, because the reduction of the axial length of the plate 116 would make it impossible for the plate 116 to firmly hold the pin 118 that receives the load. Therefore, in the apparatus 12, even if the axial length of output shaft 18 is reduced, such a reduction of the axial length of the output shaft 18 would lead to only reduction of the amount by which the output shaft 18 is introduced in the recess 114, and not lead to reduction of the entire axial length of the apparatus 12. As an example of a steering-force transmitting apparatus in which the torsion bar and the output shaft are shortened, a steering-force transmitting apparatus 220 is shown in view (a) of FIG. 13.

In the steering-force transmitting apparatus 200 according to the above-described second embodiment, the turning-device-side shaft is supported, at the annular-shaped plate 206 rather than at the input-side shaft 88, by the EPS housing 204, and the fitted portion of the pin 210 (which portion is fitted in the plate 206) has the axial length that is relatively large. Therefore, there is room for reduction of the axial length of the annular-shaped plate 206. That is, in a steering-force transmitting apparatus in which the turning-device-side shaft is supported, at the output-side shaft and the annular-shaped plate, by the EPS housing, the axial lengths of the respective output shaft and annular-shaped plate can be reduced whereby the entire axial length of the apparatus can be reduced. A steering-force transmitting apparatus 230 constructed according to a third embodiment of the invention is shown in view (b) of FIG. 13. In this apparatus 230 of the third embodiment, its entire axial length is reduced by reducing the axial lengths of the respective output shaft and annular-shaped plate.

Figure 13:
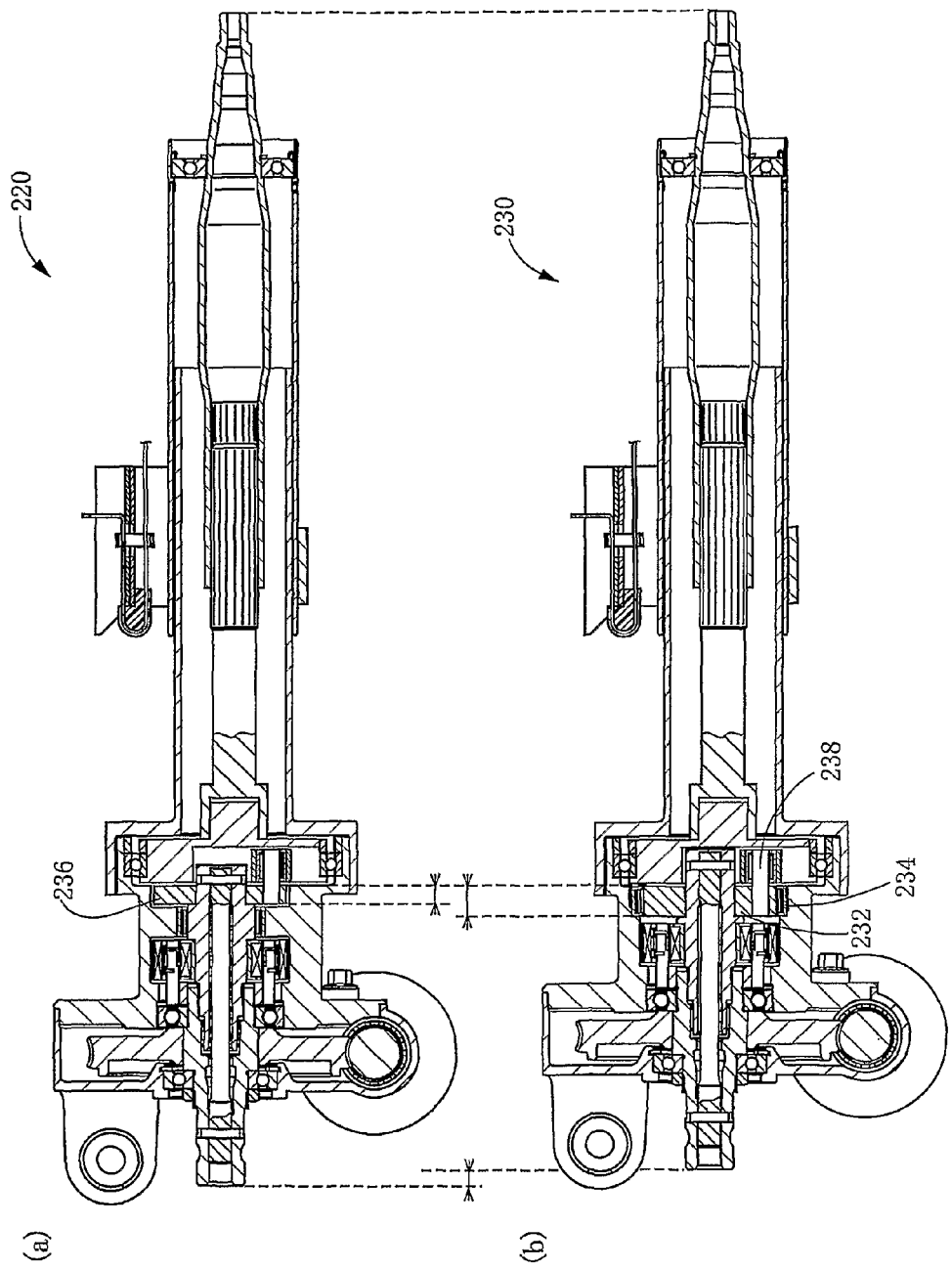
FIG. 13 is a set of views showing a steering-force transmitting apparatus according to a third embodiment of the invention, as compared with a steering-force transmitting apparatus as a comparative example.

Unlike in the steering-force transmitting apparatus 220 shown in the view (a) of FIG. 13, in the steering-force transmitting apparatus 230 shown in the view (b) of FIG. 13, a needle bearing 234 is fitted on an outer circumferential surface of an annular-shaped plate 232, and an axial length of the annular-shaped plate 232 is made larger than an axial length of an annular-shaped plate 236 that is included in the steering-force transmitting apparatus 220 shown in the view (a) of FIG. 13. As is apparent from FIG. 13, in the apparatus 230 of the third embodiment, as compared with the apparatus 220 as the comparative example, its entire axial length is made smaller, but the axial length of the fitted portion of a pin 238 is made larger. Thus, in the apparatus 230, the entire axial length can be made further smaller whereby its installability onto the vehicle can be further improved. Meanwhile, in the apparatus 230, the pin 238 can be reliably held by the annular-shaped plate 232 even when the load acting on the pin 238 is considerably increased, thereby increasing a reliability of the apparatus 230 as a whole.

The invention claimed is:

1. A steering-force transmitting apparatus for a vehicle having (i) a steering operation member operable by an operator of the vehicle and (ii) a wheel turning device configured to turn a wheel of the vehicle, said steering-force transmitting apparatus comprising:
(a) an operating-member-side shaft connected at one of axially opposite end portions thereof to the steering operation member, and rotatable about an axis thereof;
(b) a turning-device-side shaft connected at one of axially opposite end portions thereof to the wheel tuning device, and rotatable about an axis thereof which is parallel to said axis of said operating-member-side shaft and which is offset from said axis of said operating-member-side shaft by a predetermined offset distance; and (c) a rotation transmitting mechanism including:
- (c-1) an engaging portion which is provided in a first shaft as one of said operating-member-side shaft and said turning-device-side shaft, and which is held in engagement with the other of said axially opposite end portions of a second shaft as the other of said operating-member-side shaft and said turning-device-side shaft, said engaging portion being located in a non-central position that is offset from said axis of said first shaft in a radial direction of said first shaft by a distance larger than said predetermined offset distance; and
- (c-2) a guide passage which is provided in said other of said axially opposite end portions of said second shaft and which is held in engagement with said engaging portion, said guide passage extending in a radial direction of said second shaft so as to allow displacement of said engaging portion in said radial direction of said second shaft, wherein said rotation transmitting mechanism is configured to change a rotational phase difference between a rotational phase of said first shaft and a rotational phase of said second shaft, while causing one of said first and second shafts to be rotated by rotation of the other of said first and second shafts, wherein said first shaft includes:
- a first main body portion which is a main body portion of said first shaft and which is located in said axis of said first shaft, said first main body portion having axially opposite end portions such that one of said axially opposite end portions of said first main body portion is a second-shaft side end portion of said first main body portion that is closer to said second shaft than the other of said axially opposite end portions of said first main body portion, said first main body portion having axially opposite ends such that one of said axially opposite ends of said first main body portion is a second-shaft side end of said first main body portion that is closer to said second shaft than the other of said axially opposite ends of said first main body portion;
- a radially extending portion provided in said second-shaft side end portion of said first main body portion, and extending outwardly from said first main body portion in said radial direction of said first shaft, said radially extending portion being axially spaced apart from said second-shaft side end of said first main body portion, in an axial direction which is away from said second shaft and which is parallel to said axis of said first shaft and said axis of said second shaft; and
- an axially protruding portion provided in said first shaft and located in said non-central position, said axially protruding portion protruding from said radially extending portion in a direction which is toward said second shaft and which is parallel to said axial direction, wherein said second shaft includes:
- a second main body portion which is a main body portion of said second shaft, and which has axially opposite end portions such that one of said axially opposite end portions of said second main body portion is a first-shaft side end portion of said second main body portion that is closer to said first shaft than the other of said axially opposite end portions of said second main body portion; and
- a radially projecting portion provided in said first-shaft side end portion of said second main body portion, and projecting outwardly from said second main body portion in said radial direction of said second shaft, said radially projecting portion having a radially extending groove which has an opening that opens in an axial end surface of said radially projecting portion and which extends in said radial direction of said second shaft, wherein said axially protruding portion of said first shaft is disposed into said radially extending groove of said second shaft via said opening, so as to be engaged in said radially extending groove, whereby said axially protruding portion serves as said engaging portion and said radially extending groove serves as said guide passage, wherein said second shaft has axially opposite ends such that one of said axially opposite ends of said second shaft is a first-shaft side end of said second shaft that is closer to said first shaft than the other of said axially opposite ends of said second shaft, wherein said axial end surface of said radially projecting portion constitutes a surface of said first-shaft side end of said second shaft, and wherein said second-shaft side end of said first main body portion is located between said first-shaft side end of said second shaft and said one of said axially opposite end portions of said second shaft in said axial direction.

2. The steering-force transmitting apparatus according to claim 1,
wherein said second shaft has a recess that opens in said axial end surface of said radially projecting portion, and
wherein said second-shaft side end portion of said first main body portion is accommodated in said recess of said second shaft.

3. The steering-force transmitting apparatus according to claim 2,
wherein said radially extending groove has a proximal end as one of radially opposite ends thereof which is closer to said axis of said second shaft than the other of said radially opposite ends, and
wherein said radially extending groove is connected at said proximal end thereof to said recess.

4. The steering-force transmitting apparatus according to claim 3, wherein said recess has a depth that is the same as a depth of said radially extending groove, as measured in said axial direction.

5. The steering-force transmitting apparatus according to claim 1, further comprising a housing that is fixed to a part of a body of the vehicle such that said first shaft is supported, at at least two supported portions thereof that are spaced apart from each other in said axial direction, by said housing,
wherein said radially extending portion is an annular-shaped flange portion which is fixed to said first main body portion and is coaxial with said first main body portion, and
wherein said radially extending portion corresponds to one of said at least two supported portions of said first shaft, and has an outer circumferential surface at which said first shaft is rotatably supported by said housing.

6. The steering-force transmitting apparatus according to claim 5,
wherein said second shaft has a recess that opens in said axial end surface of said radially projecting portion, and wherein said second-shaft side end portion of said first main body portion is accommodated in said recess of said second shaft.

7. The steering-force transmitting apparatus according to claim 1, said steering-force transmitting apparatus further comprising:
an assisting device configured to generate, based on an amount of twisting deformation of a torsion bar, an assisting force that assists the wheel to be turned,
wherein said first main body portion is a hollow portion having a space extending along said axis of said first shaft, and
wherein said first shaft has said torsion bar which is disposed in said space and which has an axial end portion as one of axially opposite end portions thereof, said axial end portion of said torsion bar being non-rotatably held by said second-shaft side end portion of said first main body portion such that said torsion bar is twistable by a rotational force that is applied to said first shaft.

8. The steering-force transmitting apparatus according to claim 7, wherein said first shaft is said turning-device-side shaft and said second shaft is said operating-member-side shaft.

9. The steering-force transmitting apparatus according to claim 8,
wherein, when said steering operation member is rotated by 90° clockwise or counterclockwise from a neutral position, said second shaft is rotated about said axis of said second shaft by 90° and said first shaft is rotated about said axis of said first shaft by less than 90°.

10. The steering-force transmitting apparatus according to claim 7,
wherein said first main body portion includes first and second hollow shafts which are rotatable relative to each other while maintaining a coaxial relationship between said first and second hollow shafts,
wherein said first and second hollow shafts cooperate with each other to define said space in said first main body portion, and
wherein said axial end portion of said torsion bar as said one of said axially opposite end portions of said torsion bar is non-rotatably held by said first hollow shaft, and another end portion of said torsion bar as the other of said axially opposite end portions of said torsion bar is non-rotatably held by said second hollow shaft.

11. The steering-force transmitting apparatus according to claim 10, further comprising a housing that is fixed to a part of a body of the vehicle such that said first shaft is supported, at at least two supported portions thereof that are spaced apart from each other in said axial direction, by said housing,
wherein said radially extending portion is an annular-shaped flange portion which is fixed to said first hollow shaft and is coaxial with said first hollow shaft,
wherein said radially extending portion corresponds to one of said at least two supported portions of said first shaft, and has an outer circumferential surface at which said first shaft is rotatably supported by said housing, and
wherein said second hollow shaft includes a supported portion which corresponds to another one of said at least two supported portions of said second shaft, said supported portion of said second hollow shaft having an outer circumferential surface at which said first shaft is rotatably supported by said housing.

12. The steering-force transmitting apparatus according to claim 10,
wherein said first shaft is said turning-device-side shaft and said second shaft is said operating-member-side shaft, and
wherein said assisting device is configured to apply said assisting force to said second hollow shaft.

13. The steering-force transmitting apparatus according to claim 1,
wherein said radially extending groove is defined by a pair of side wall surfaces which extend in said radial direction of said second shaft and which are opposed to each other, and
wherein said axially protruding portion engaged in said radially extending groove is interposed between said pair of side wall surfaces, so as to limit displacement of said axially protruding portion in a circumferential direction of said second shaft.

14. The steering-force transmitting apparatus according to claim 13, wherein said axially protruding portion includes a roller which is interposed between said side wall surfaces and which is rollable so as to be moved within said radially extending groove.

15. The steering-force transmitting apparatus according to claim 14,
wherein said radially extending portion has a hole which has an opening facing said surface of said first-shaft side end of said second shaft and which is located in said non-central position,
wherein said axially protruding portion includes a pin which has a fitted portion and an axially projecting portion, such that said fitted portion is fixedly fitted in said hole, and such that said axially projecting portion projects from said radially extending portion in said direction which is toward said second shaft and which is parallel to said axial direction, and
wherein said roller is rotatably held by said axially projecting portion of said pin.

16. The steering-force transmitting apparatus according to claim 1,
wherein said radially extending groove has only a single opening.

* * * * *